Jan. 28, 1941.  E. T. FERNGREN  2,230,188

PROCESS OF AND APPARATUS FOR FORMING ARTICLES FROM PLASTIC MATERIAL

Filed March 29, 1938  15 Sheets-Sheet 1

Witness
W. B. Thayer

Inventor
Enoch T. Ferngren
by Brown Fanbure
Attorneys

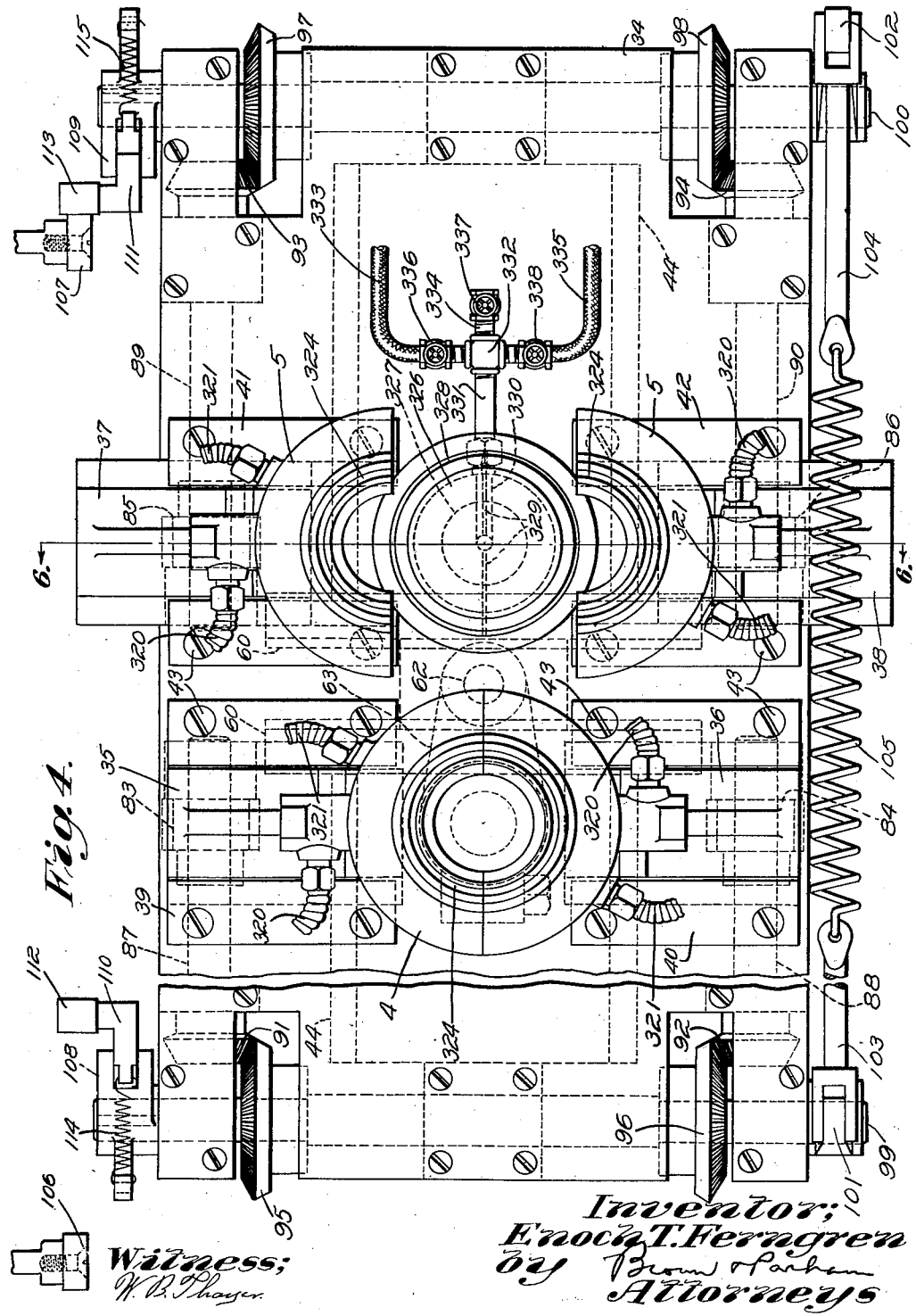

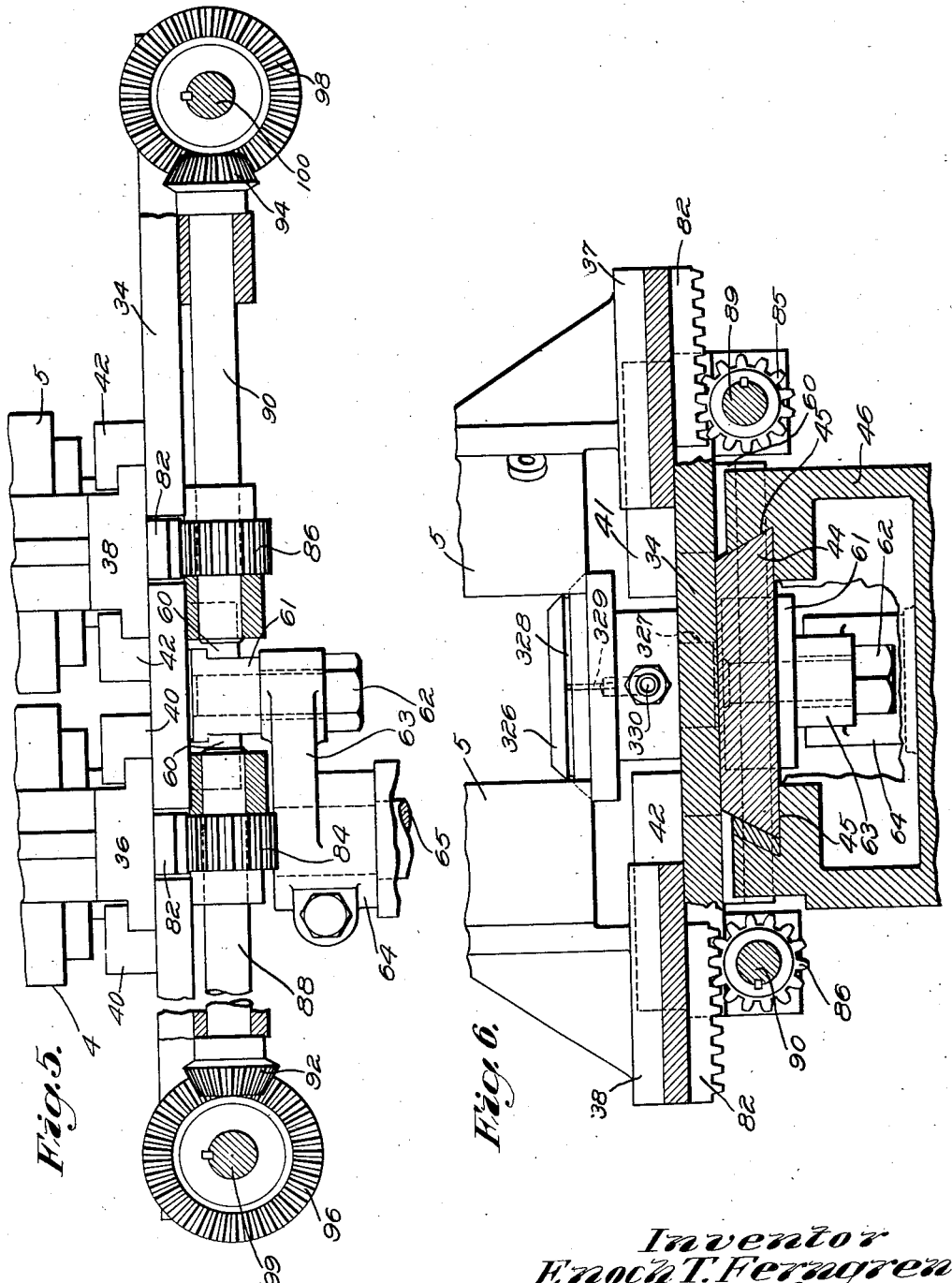

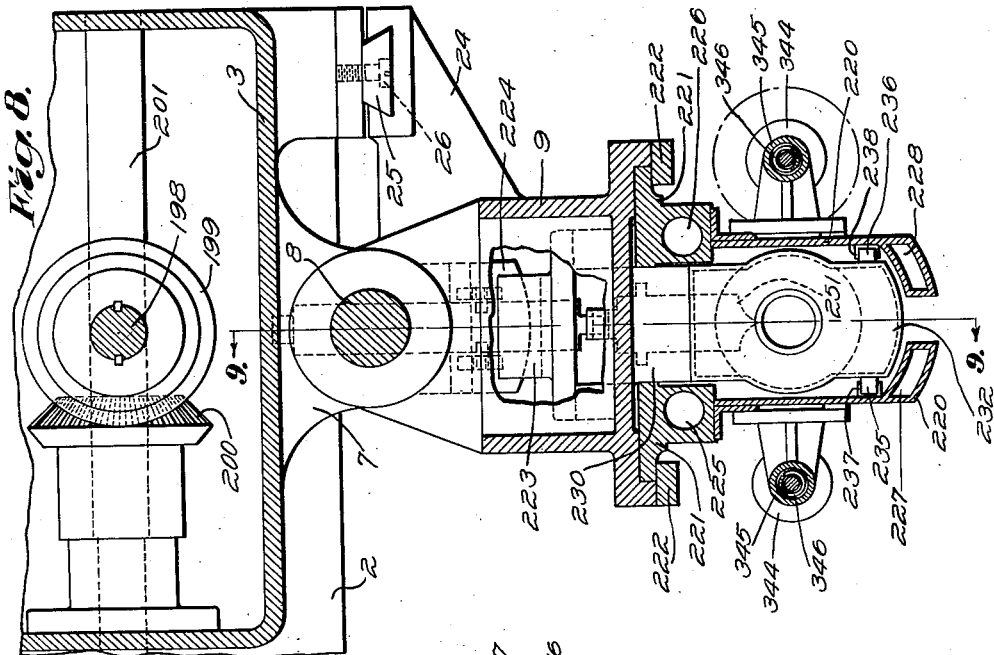

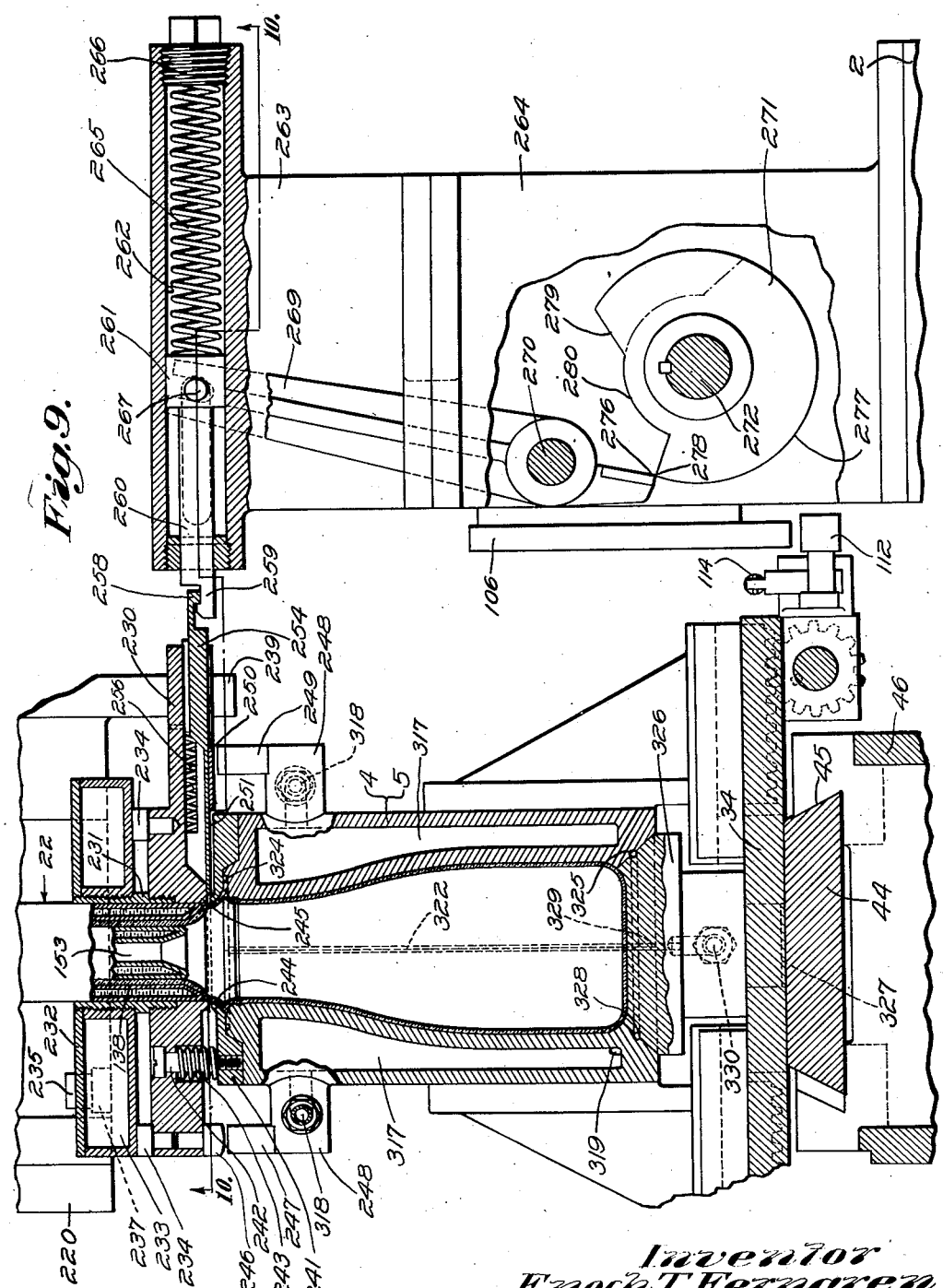

Jan. 28, 1941.                E. T. FERNGREN                2,230,188
PROCESS OF AND APPARATUS FOR FORMING ARTICLES FROM PLASTIC MATERIAL
Filed March 29, 1938          15 Sheets-Sheet 8
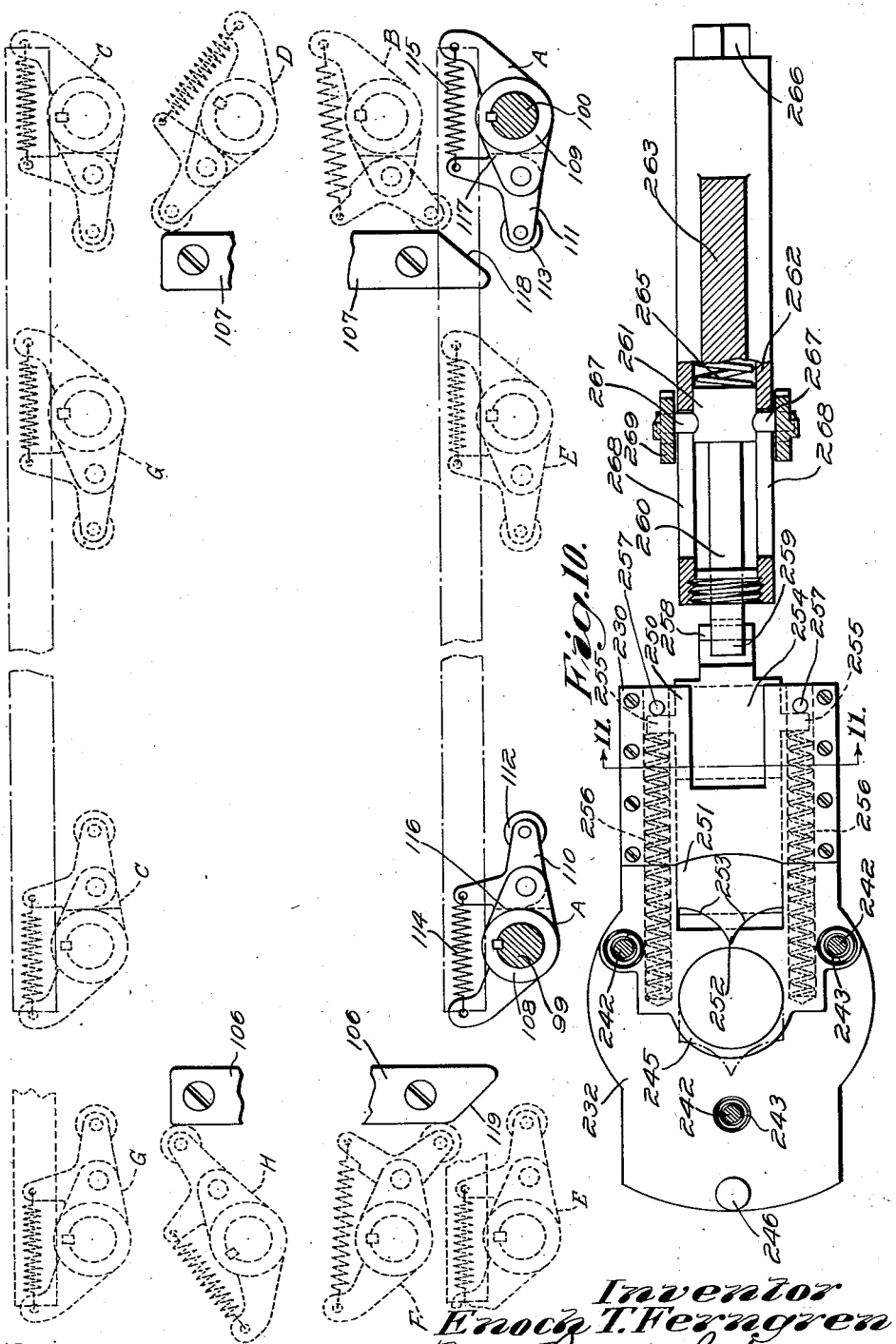
Witness
W. B. Thayer.
Inventor
Enoch T. Ferngren
by Brown & Barton
Attorneys

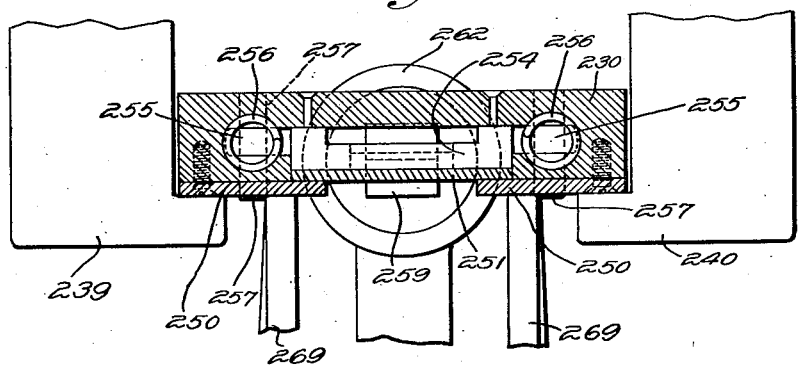
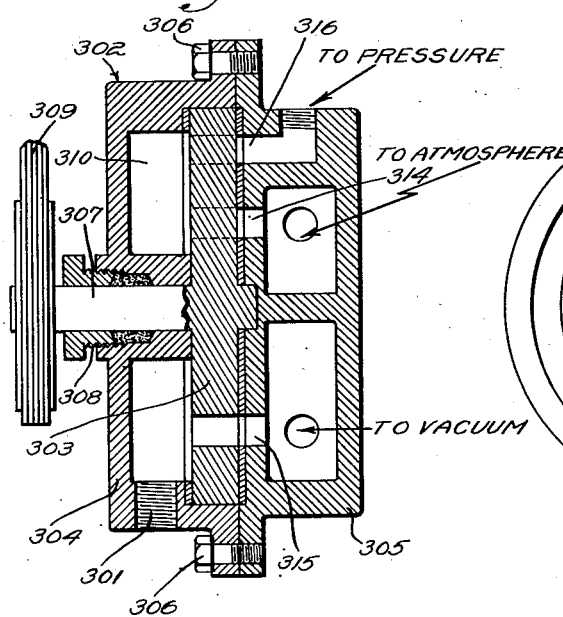
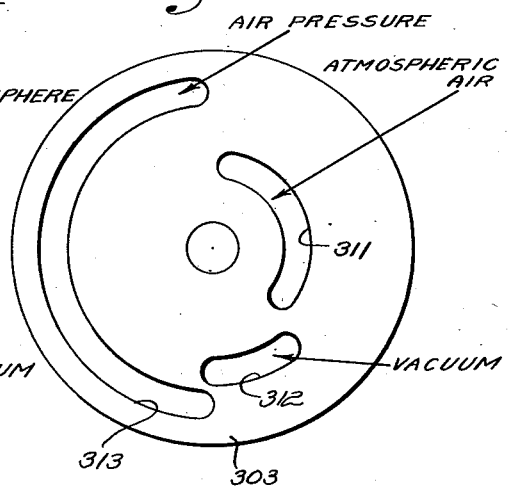

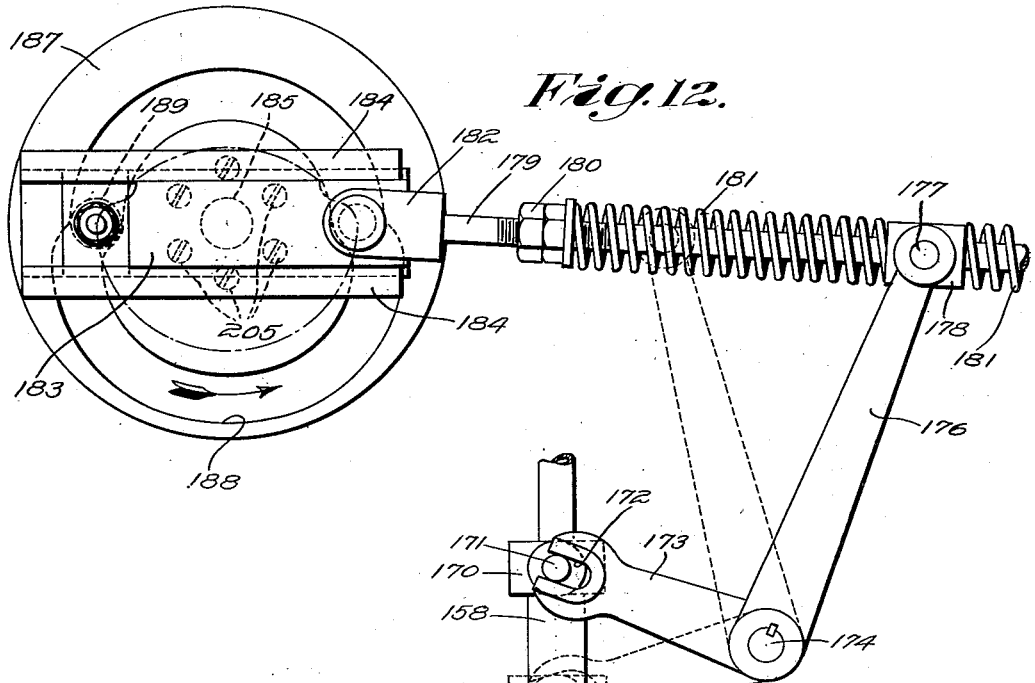
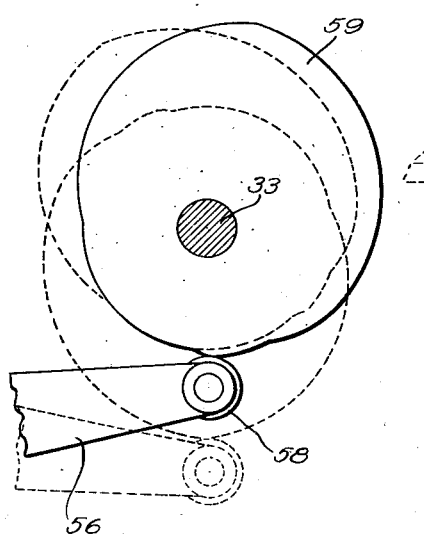
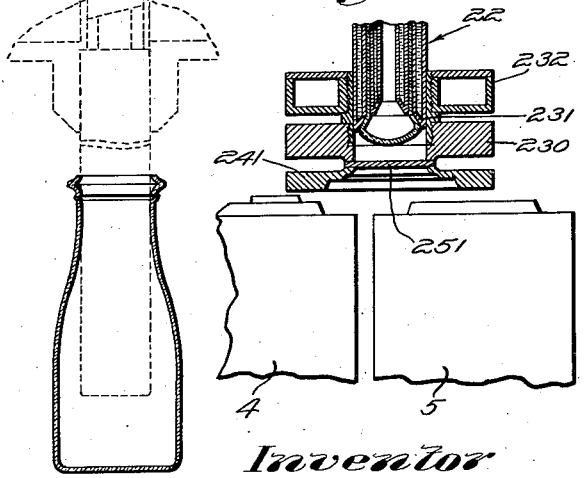

Jan. 28, 1941.   E. T. FERNGREN   2,230,188
PROCESS OF AND APPARATUS FOR FORMING ARTICLES FROM PLASTIC MATERIAL
Filed March 29, 1938   15 Sheets-Sheet 11

Inventor
Enok T. Ferngren
by Brown Norham
Attorneys

Witness
W. B. Thayer

Jan. 28, 1941.    E. T. FERNGREN    2,230,188
PROCESS OF AND APPARATUS FOR FORMING ARTICLES FROM PLASTIC MATERIAL
Filed March 29, 1938    15 Sheets-Sheet 12
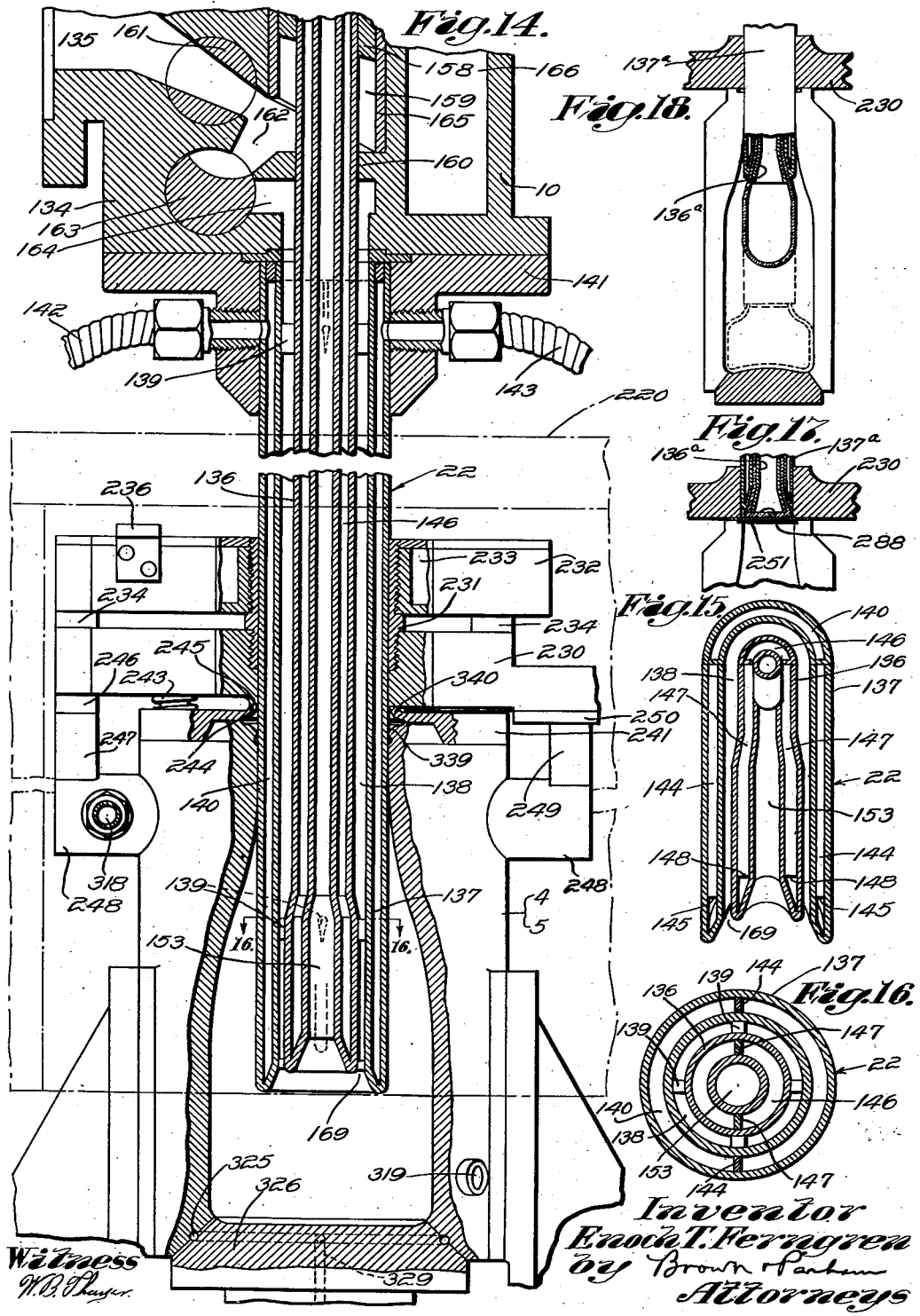
Inventor
Enoch T. Ferngren
by Brown & Parham
Attorneys
Witness
W. D. Thayer

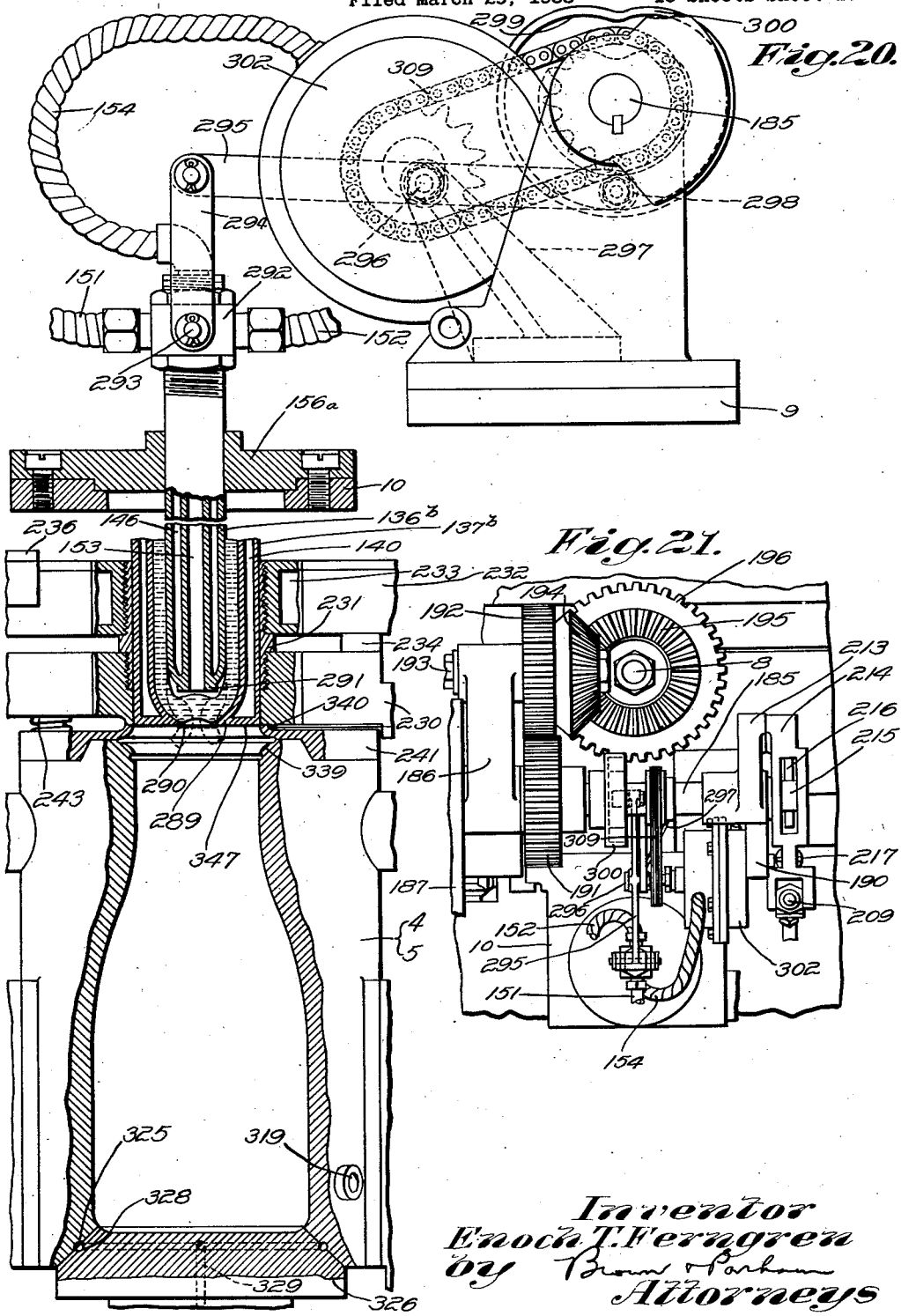

Jan. 28, 1941.   E. T. FERNGREN   2,230,188
PROCESS OF AND APPARATUS FOR FORMING ARTICLES FROM PLASTIC MATERIAL
Filed March 29, 1938   15 Sheets-Sheet 14

Witness
W. B. Thayer.

Inventor
Enoch T. Ferngren
by Brown & Parham
Attorneys

Jan. 28, 1941.  E. T. FERNGREN  2,230,188
PROCESS OF AND APPARATUS FOR FORMING ARTICLES FROM PLASTIC MATERIAL
Filed March 29, 1938  15 Sheets-Sheet 15

Inventor
Enoch T. Ferngren
by Brown & Parham
Attorneys

Witness
W. B. Thayer

Patented Jan. 28, 1941

2,230,188

UNITED STATES PATENT OFFICE 2,230,188

PROCESS OF AND APPARATUS FOR FORMING ARTICLES FROM PLASTIC MATERIAL

Enoch T. Ferngren, Little Neck, Long Island, N. Y., assignor to Plax Corporation, Hartford, Conn., a corporation of Delaware Application March 29, 1938, Serial No. 198,646

63 Claims. (Cl. 18—5)

This invention relates to a process of and apparatus for forming articles from plastic material, and more particularly to the forming of hollow blown articles, such as bottles, from organic plastic material which is temperature-sensitive and which at normal temperatures is hard, but which may be rendered fluent, plastic and moldable at elevated temperatures and thereafter may be rigidified in a suitable manner.

The present invention is a continuation in part of my copending application, Serial No. 658,486, filed Feb. 25, 1933 now Patent No. 2,128,239 granted Aug. 30, 1938, and further is a continuation in part and in effect a substitute for my copending application, Serial No. 16,864, filed April 17, 1935, the latter case disclosing substantially all the essential elements herein disclosed.

Among the objects of the present invention are to provide a process or processes and apparatus by which plastic material, and particularly organic plastic material, may be treated first to convert or bring it to a plastic and moldable condition, then to form it into an article of the desired shape, and more particularly to form it into a hollow blown article by a process including extruding the material from a suitable orifice of a nozzle as a closed-ended hollow body and thereafter blowing this body to conformity with the cavity of a suitable mold. The article thus formed must then be rigidified, by cooling, in the case of thermoplastic materials, such as cellulose acetate, or by some other process, for example, heating, in the case of thermo-setting materials, such as many condensation products now well known in the plastic art.

A further object of the invention is to provide a process and apparatus by which the material, once it has been suitably brought to a plastic and moldable condition, may be handled, first to move a selected and to a certain extent a variable amount of it from the original supply body or plasticating means to and through a nozzle in preparation for the forming of an article, and in this connection to provide a means by which the material may be extruded from a parent supply body in a nozzle or like means, through an orifice at a pressure independent of such pressure as may be used on the material in converting it to a plastic and moldable condition.

A further object of the invention is to provide a suitable extrusion nozzle, preferably comprising spaced inner and outer nozzle members, providing a tubular passage therebetween, in which the plastic material may be preformed as a tubular body and thereafter extruded without substantial change in shape from an orifice at the discharge end of the nozzle.

A further object of the invention is to provide in an extrusion nozzle of the character set forth, means by which the material therein may be subjected preferably both internally and externally to suitable temperatures, so as to maintain it at the desired viscosity during its formation as a tubular body and during its extrusion from the nozzle.

A further object of the invention is to provide for the closing of the leading end of a tubular body of plastic material contained within a nozzle of the character above set forth so as to form the material into a closed-ended hollow body which may thereafter be extruded from the nozzle and expanded by internally applied pneumatic pressure to conformity with a mold.

A further object of the invention is to provide for the expansion of such a closed-ended hollow body, as above set forth, in a mold by the use of internally applied pneumatic pressure so as to form an article of the desired shape in the mold, which will have a selected wall thickness or variation in wall thicknesses throughout. It is sometimes advantageous to project the extrusion nozzle into the mold to a selected extent, either to form a closed end for the tubular hollow body within the nozzle in conjunction with the bottom wall of the mold or to assist in the expansion of the material by extruding the material and expanding it against the wall of the mold while simultaneously and progressively causing such a relative movement between the nozzle and the mold as in effect to move the nozzle outwardly from the mold during the extrusion and expansion of the plastic material.

A further object of the invention is to provide for the establishment of a suitable and selected back pressure within the mold during the expansion of the closed-ended hollow body of plastic material therein by selectively establishing pressure or vacuum conditions or a restricted venting of the air in the mold to the atmosphere, in accordance with the expansion characteristics of the particular material being handled.

A further object of the present invention is to provide suitable means for severing an article formed in a mold as aforesaid from the parent body of plastic material from which that article is made and which parent body remains in an extrusion nozzle.

A further object of the present invention is to provide in connection with the making of bottles by a process and/or apparatus as above set forth, for the forming of finished an reinforced neck portions for the bottles so made and preferably also to provide for the forming of a bottle in one mold simultaneously with the finishing of the neck of another bottle in another mold.

A further object of the present invention is to provide apparatus for carrying out the various process steps above outlined, and particularly apparatus providing a plurality of molds having means for moving them in respect to an extrusion nozzle and for bringing them successively into alignment with the nozzle and thereafter with neck finishing means, and also to provide novel apparatus by which the molds may be suitably opened and closed at the desired times in the cycle of the apparatus as a whole.

Other and more detailed objects of the present invention will become apparent from the following specification and appended claims when taken in connection with the accompanying drawings, in which:

Fig. 4 is a view substantially in plan of the mold table with the molds thereon, a portion of the table being broken out in view of space requirements;

Fig. 5 is a view principally in front elevation of the mold table of Fig. 4 and certain of the operating means associated therewith, some portions of the structure being broken away and shown in vertical section;

Fig. 6 is a view substantially in transverse vertical section on the line 6—6 of Fig. 4;

Fig. 7 is a fragmentary view substantially in horizontal section on the line 7—7 of Fig. 1, a rotated position of certain parts being diagrammatically indicated in dotted lines;

Fig. 8 is a somewhat similar view substantially in horizontal section on the line 8—8 of Fig. 1, some parts being further broken away to show the interior construction;

Fig. 9 is a fragmentary view substantially in vertical section on the line 9—9 of Fig. 8, illustrating the forming of a bottle in a mold and the shearing mechanism and its operating means for severing a formed bottle from the plastic material remaining in the nozzle;

Fig. 10 is an inverted plan view of the shearing mechanism with parts in horizontal section taken substantially on the line 10—10 of Fig. 9;

Fig. 11 is a view in transverse vertical section substantially on the line 11—11 of Fig. 10, showing also the means for supporting the shear housing during the movement of the molds to their lowermost position;

Fig. 12 is a somewhat diagrammatic view principally in elevation illustrating the mechanism for operating the plunger for extruding the plastic material from the nozzle;

Fig. 14 is a view principally in central vertical section of the lower portions of the nozzle below those portions shown in Fig. 13, illustrating the relation of the nozzle parts to a mold during the forming of an article according to one process which may be carried out in the machine;

Fig. 15 is a fragmentary view partly in perspective and partly in central vertical section illustrating the construction of the lower end of the nozzle of Fig. 14;

Fig. 16 is a view in transverse horizontal section of the lower end portion of the nozzle, taken on the line 16—16 of Fig. 14;

Fig. 17 is a somewhat diagrammatic fragmentary view in vertical section illustrating a modified form of nozzle and one way in which the end of a hollow body of plastic material therein may be closed;

Fig. 18 is a diagrammatic view, principally in vertical section, illustrating a nozzle somewhat similar to that shown in Fig. 17 and illustrating one way of forming an article in a mold by extrusion and blowing;

Fig. 19 is a somewhat diagrammatic view illustrating the cam for raising and lowering the molds and certain associated means and showing in dotted lines various positions of this cam and of the follower associated therewith;

Fig. 20 is a detail view partly in side elevation and partly in central vertical section showing another modified form of nozzle in association with a mold and showing means for vertically moving the inner nozzle member to effect a shearing of the plastic material in conjunction with the outer nozzle member;

Fig. 21 is a fragmentary plan view showing the variations which may be made in the operating mechanism at the top of the machine to accommodate this mechanism to the operation of the device shown in Fig. 20;

Fig. 22 is a more or less diagrammatic detail view partly in vertical section and partly in elevation illustrating the means for opening the molds and showing different positions of these means during the mechanical cycle of the apparatus;

Fig. 23 is a view in vertical section of the valve for controlling the pneumatic pressure within the nozzle;

Fig. 24 is a side elevation of the rotatable member of the valve shown in Fig. 23;

Figure 26:
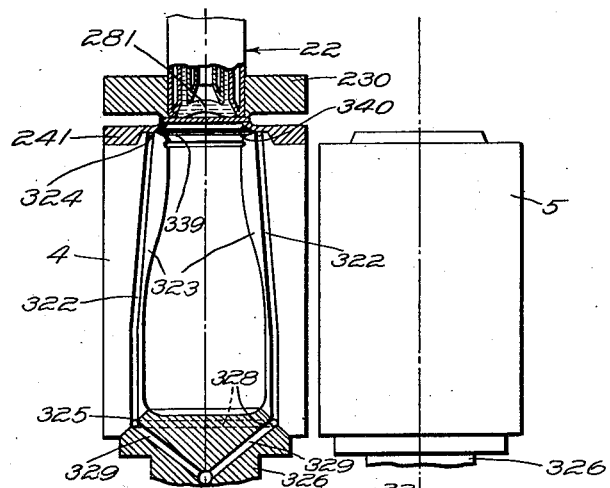
Figure 27:
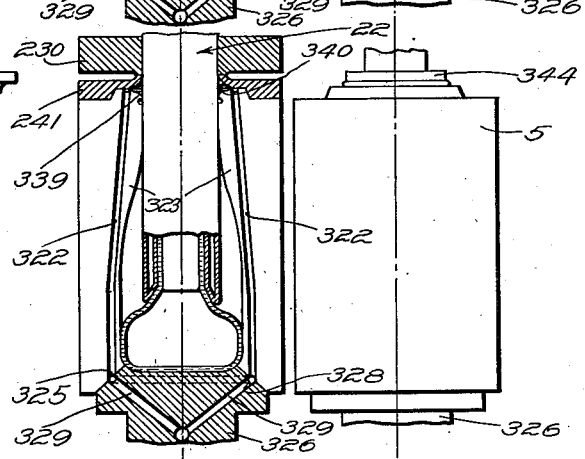
Figure 28:
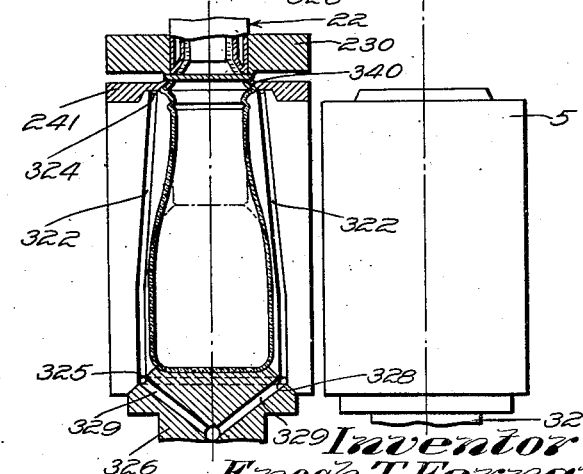
Figure 30:
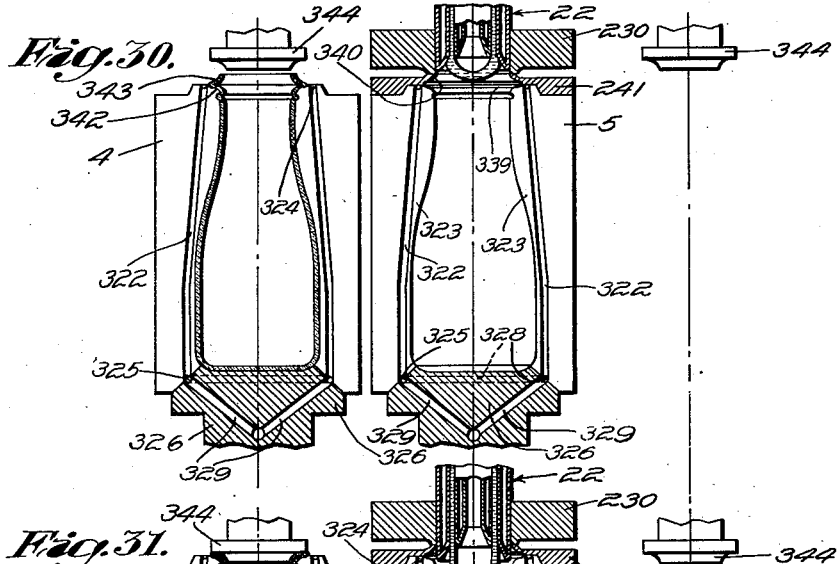
Figure 31:
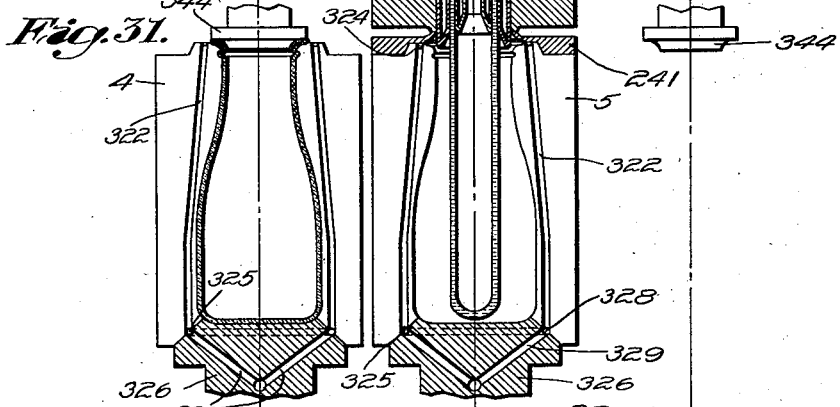
Figure 32:
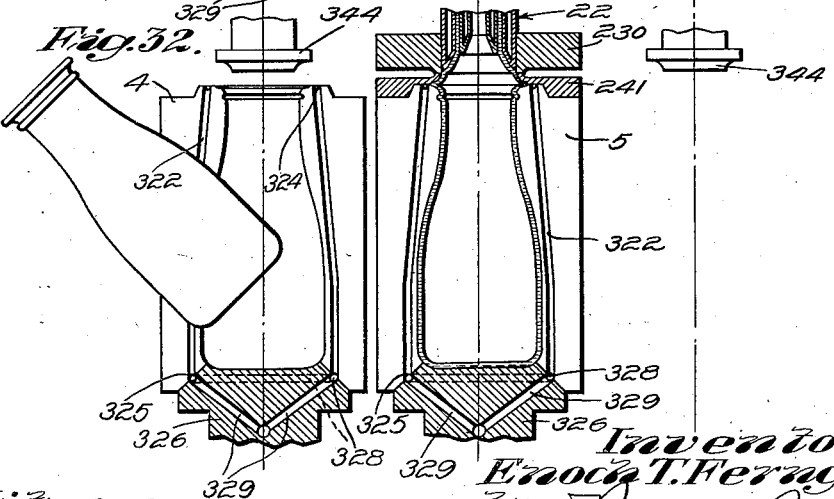

Figs. 26, 27 and 28 are diagrammatic views illustrating different stages in a cycle of forming bottles according to one process which may be practiced by the machine shown in the preceding figures, Fig. 26 showing the end of the tubular body of plastic material closed above a shearing means and retracted therefrom by the internal application of vacuum, Fig. 27 showing the nozzle introduced a substantial distance into the mold and a hollow body of plastic material being extruded and blown from the nozzle against the bottom and sides of the mold, and Fig. 28 showing in dotted lines an intermediate position and in full lines the bottle completely formed and severed from the parent body of plastic material within the nozzle;

Fig. 29 is a view following the stage of the process shown in Fig. 28 and illustrating the shifting of the molds, the view being in side elevation and diagrammatic as to the molds and in central vertical section as to the nozzle and certain associated means; and Figs. 30, 31 and 32 are another series of diagrammatic views illustrating an article being formed in the other of the pair of molds of Figs. 26 to 28 and by a somewhat different process, Fig. 30 illustrating the nozzle at the upper end of the mold and having a closed-ended hollow body of plastic material therein, Fig. 31, the closed-ended hollow body of plastic material extruded from the nozzle almost to the full length of the mold, but without substantial lateral distention, and Fig. 32, the article completely formed in the mold, these figures showing a process of forming bottles wherein the nozzle does not penetrate to any substantial extent into the interior of the mold.

*Process and general arrangements*

The process of forming articles, particularly blown hollow articles, such as bottles, from plastic material, and particularly organic plastic material, such for example as cellulose acetate, which is a thermoplastic material, hard at normal temperatures and rendered plastic and moldable under elevated temperatures and pressures, comprises first the bringing of the material to a plastic and moldable condition. For this purpose, when using most thermoplastic materials, of which cellulose acetate is a good example, the material in a comminuted form is subjected simultaneously to heat and pressure. In the present instance, the means shown for accomplishing this purpose is per se no part of the present invention, but is illustrated substantially in accordance with the patent to Gordon No. 1,935,050. This means is not specifically disclosed in my application, Serial No. 16,864. A machine substantially in accordance with the Gordon patent has been used by me with a machine substantially as herein disclosed in the successful manufacture of bottles from cellulose acetate.

The plastic material which is rendered fluent, plastic and moldable by the means shown, or by some other means, is introduced into the machine which particularly forms a subject matter of this invention from an apparatus point of view and into an extrusion nozzle of that machine. Inasmuch as the plasticating means or means for bringing the material to a plastic and moldable condition is substantially continuously operated and the means for utilizing the material by extrusion and blowing as hereinafter set forth is intermittent in its operation, means are provided for accommodating the irregularities between the supply and the use of the material. Means are further provided for segregating measured quantities of the material, each such quantity being that required in forming a single article. These quantities are extruded into a parent supply body of the material in the extrusion nozzle, which may contain an amount of plastic material either greater or less than one of said quantities.

The material as thus brought to the extrusion nozzle is maintained in a tubular form between inner and outer nozzle members, which are spaced apart to provide a tubular passage for the plastic material and which are provided with means for supplying heat to the material to maintain it at a desired condition of plasticity or viscosity. Means are preferably provided in conjunction with the nozzle for extruding the plastic material therethrough at a pressure independent of the pressure exerted on the material by the plasticating means as aforesaid. In the present instance this means is also employed in obtaining the segregated measured quantities of the plastic material as aforesaid.

The next operation in the forming of hollow articles, such as bottles, is to form a closed end for the tubular body of plastic material in the nozzle. This may be done in several ways as hereinafter set forth and usually is done at the extrusion orifice or discharge end of the nozzle.

The next operation is to extrude the material from the nozzle, while maintaining a sufficient pneumatic pressure therein to prevent the collapse of the closed-ended body of plastic material being extruded. In this connection, this closed-ended hollow body may be extruded and directly expanded against the wall of a mold cavity by the introduction of the nozzle into the mold cavity to a point adjacent to the bottom thereof followed by the gradual withdrawal of the nozzle during the extrusion and blowing, or may be extruded to substantially the full length of the mold from a nozzle having its orifice at the top thereof and thereafter expanded. I contemplate that intermediate processes between these two extremes may be used.

A plurality of molds are provided which are brought successively into alignment with the extrusion nozzle, so that articles may be formed therein by extrusion and blowing as aforesaid, which articles are completely formed while remaining integral with the parent body of plastic material within the nozzle. For this purpose, there are shown two molds mounted on a laterally reciprocating table and brought alternately into alignment with the extrusion nozzle.

Subsequent to the completion of the formation of articles as aforesaid, the completed articles within the molds are severed from the parent body of plastic material and the neck portions thereof (in the case of bottles) are finished, in this case by folding inwardly the top periphery or brim at the neck of the article onto the contiguous portion therebeneath to form a reenforced neck or lip portion for the bottle. This is done in one mold during the forming of a succeeding article in the other mold.

Figure 1:
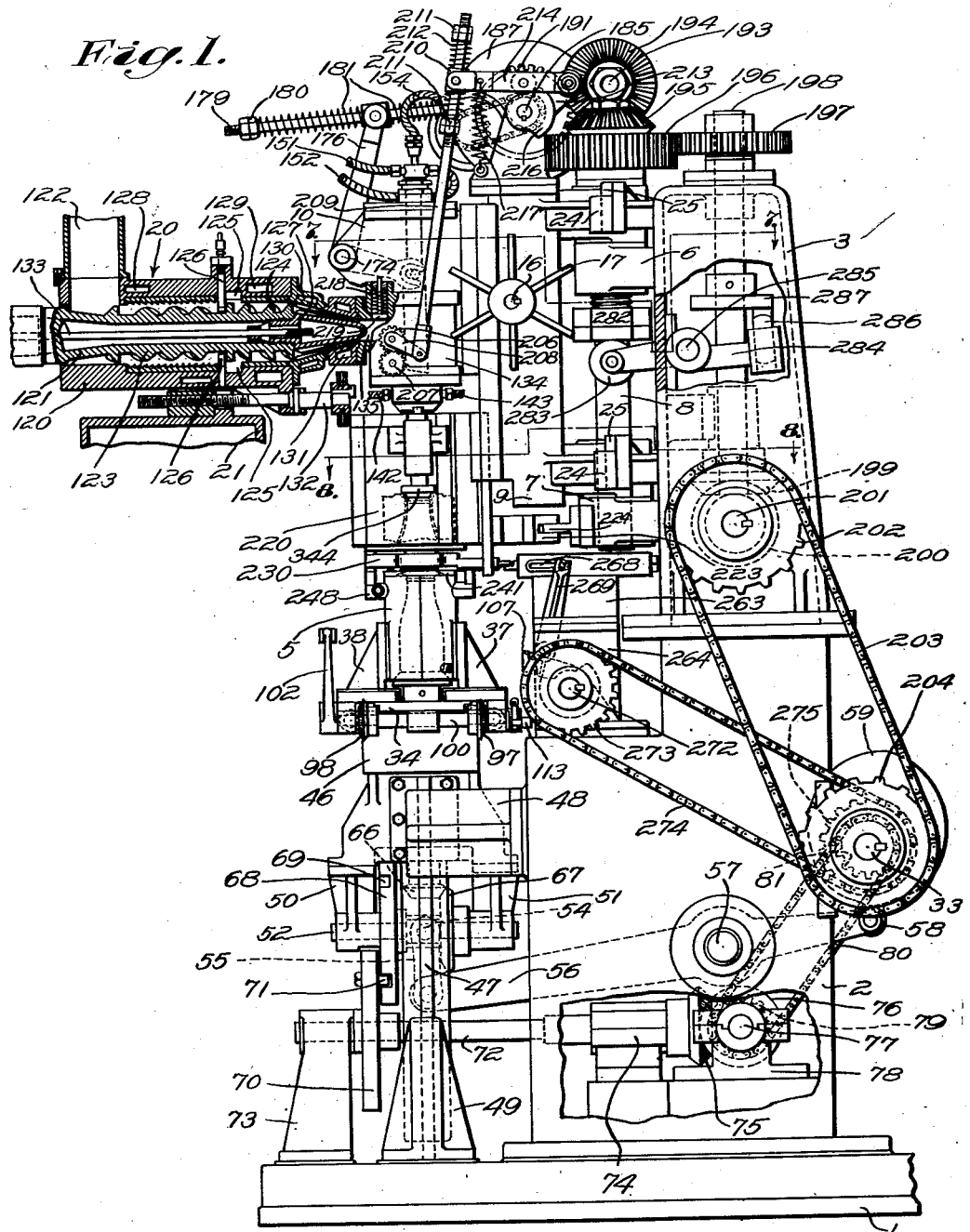
Figure 1 is a view principally in side elevation of an entire machine, but showing the means for bringing the plastic material to a moldable condition in vertical section, and also having certain other portions of the machine broken away to show the interior construction.
Figure 2:
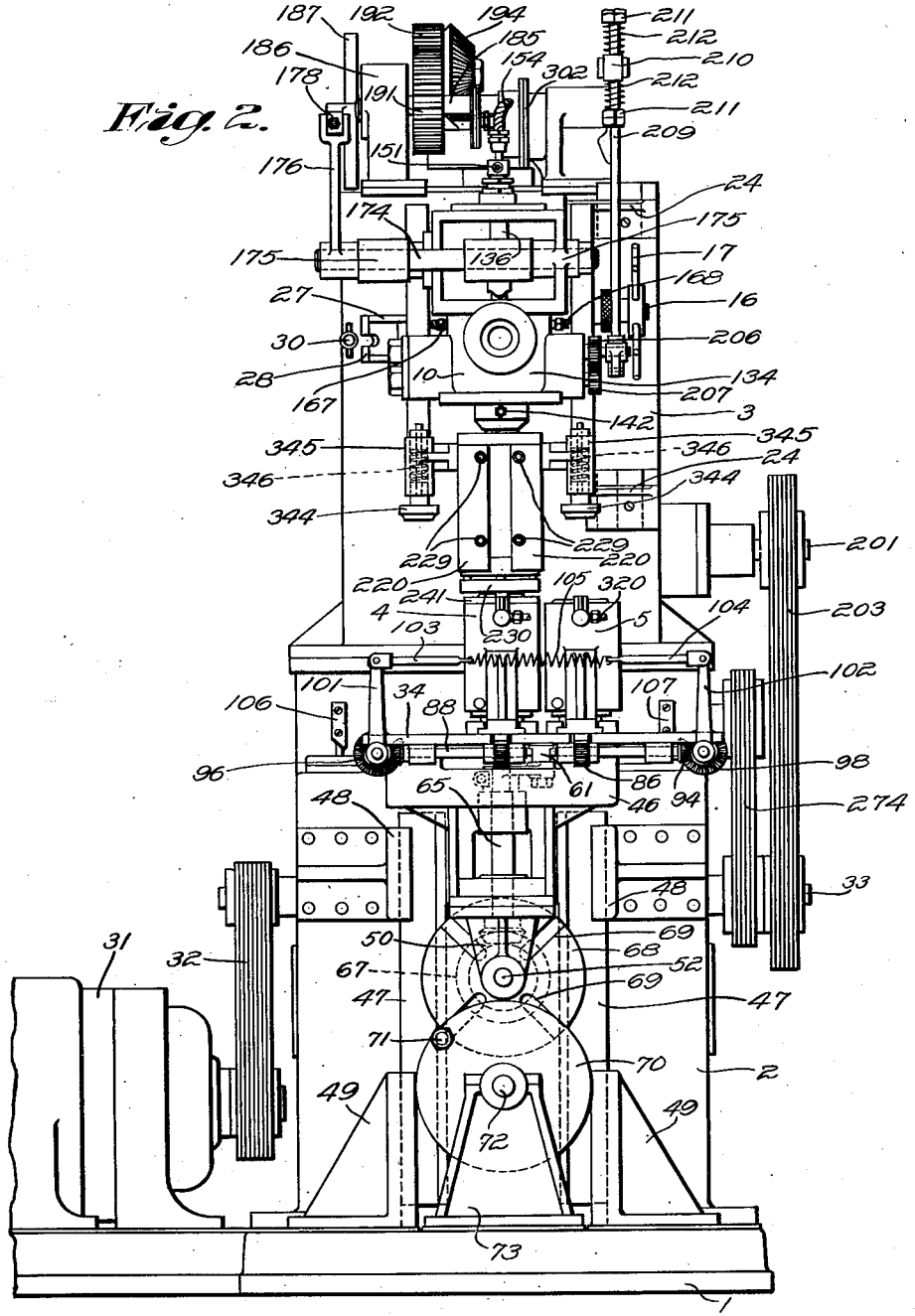
Fig. 2 is a front elevation of the entire machine.
Figure 3:
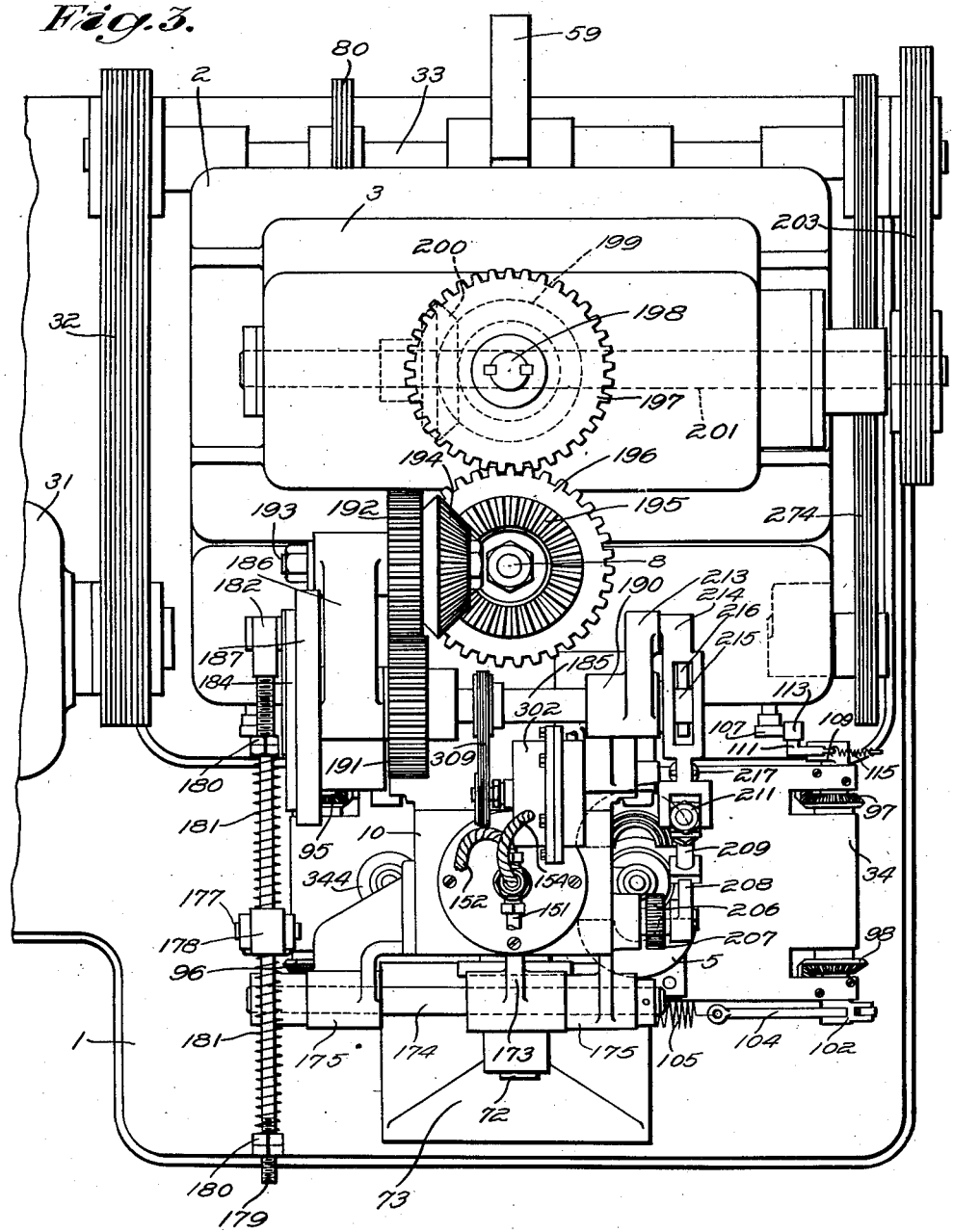
Fig. 3 is a plan view thereof.

Referring now to the drawings, and particularly Figs. 1, 2 and 3 thereof, the machine is mounted upon a base 1 and comprises a stationary structure including a lower housing 2 and upper housing 3, which are rigidly connected to each other and to the base 1. Mounted on the base 1 and the housing 2 are means supporting a pair of molds 4 and 5, which are movable vertically and also laterally reciprocable to bring them alternately to a central forming position by means and in a manner hereinafter described.

The upper housing 3 is provided with a pair of bracket lugs 6 and 7, Fig. 1, in which is rotatably mounted a vertical shaft 8. Pivoted on the shaft 8 is a bracket 9 which supports the extrusion nozzle and may also support the means for bringing the plastic material to a moldable condition. These means are mounted on a supporting member 10, Figs. 1 and 7, which is adjustably slidable with respect to the bracket 9 in guides 11, the guides extending around flange portions 12 on the support 10.

Means are provided for vertically adjusting the support 10 in respect to the bracket 9, such means comprising a rack 13 secured to a rear panel member 14 of the support 10 and arranged to mesh with a pinion 15 mounted on a transverse shaft 16, which is journaled in the bracket 9 and carries at its outer end a hand wheel 17. A knurled lock nut 18 may be threaded on the shaft 16 and arranged to be tightened against the adjacent bearing member for the shaft. Endwise movement of the shaft is prevented by suitable collars and set screws 19.

The support 10 is adapted to carry a means generally indicated at 20, Fig. 1, for plasticating the material or bringing it to a fluent and moldable condition, this means being shown as supported upon a suitable supporting means 21, which may be supported from the support 10, or if desired some other suitable support (not shown). The supporting means 21 is preferably supported from the support 10 in order to permit the vertical movement of this support with the bracket 9, as hereinafter set forth. However, if this vertical movement is omitted as may be done, the means 20 may be separately supported.

The support 10 also carries a nozzle generally indicated at 22, Fig. 14, through which the plastic material is adapted to be extruded in forming articles as hereinafter set forth. Means are also provided for extruding the material through the nozzle and for controlling the flow of the material into and from the nozzle, as set forth in detail hereinafter.

The nozzle 22 and the associated means, including the support 10 and the bracket 9, are normally maintained in a substantially stationary position, subject to the adjustment by the hand wheel 17, as above described and also to a slight vertical movement of these parts, as hereinafter set forth. It may, however, be desired that these parts be swung bodily to one side in order to change molds, to make repairs of the mold holding and operating means, or for some other purpose. For this purpose the bracket 9 is made swingable about the vertical axis of the shaft 8 between the full line position shown in Fig. 7 and the position indicated by the dotted lines 23 in that figure.

Means are provided for holding the bracket 9 and parts carried thereby in the full line position, comprising bracket portions 24, Figs. 1, 7 and 8, which may be integral with the bracket 9 and which are provided at their outer ends with dovetailed grooves to receive dovetailed guide members 25, which may be secured to the upper housing 3 by means of screws indicated at 26. This arrangement permits of the vertical movement of the bracket 9 while retaining this bracket against swinging movement about the vertical axis of the shaft 8.

When the bracket is swung to one side, clockwise as shown in Fig. 7, to the position indicated by the dotted lines 23, a bracket portion 27, Figs. 2 and 7, which may be integral with the bracket 9 and which is provided with a slotted portion 28 at its outer end, may be secured to the upper housing 3 by means of a swing bolt 29 and a thumb screw 30. This arrangement serves to prevent the means carried by the bracket 9 from swinging back toward their normal or operative position during the making of repairs on subjacent mechanism. In order to permit this swinging movement, however, it is necessary to remove the screws 26, which may be easily done.

For operating the several moving instrumentalities of the machine as hereinafter set forth, there is provided a source of power, here shown as an electric motor 31, Figs. 2 and 3, which may be connected by a suitable chain belt or other flexible but preferably positive driving means 32 to a main drive shaft 33 from which all the operating mechanisms are driven, as will be set forth in detail hereinafter.

*Molds, mounting, and operating means*

Figure 25:
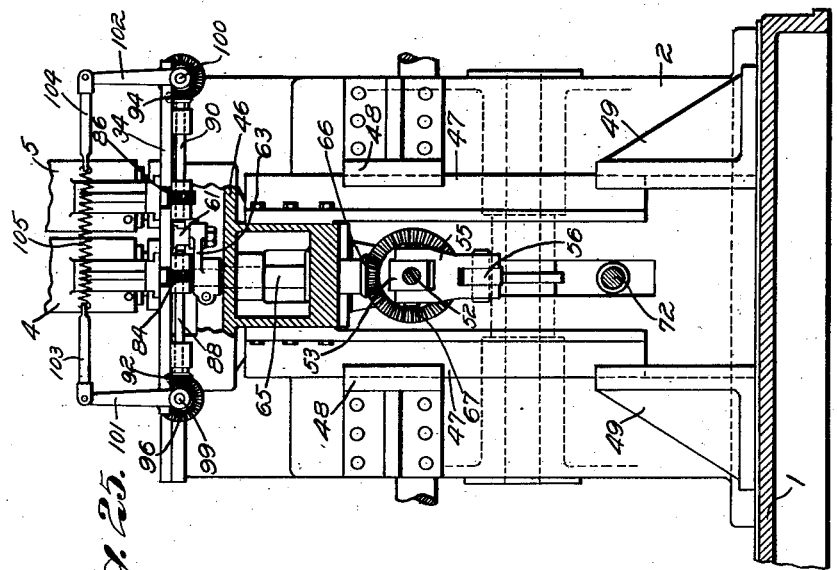
Fig. 25 is a fragmentary view partly in elevation and partly in vertical section of the means for supporting the molds and certain of the operating means for the molds.

The molds 4 and 5, as best shown in Figs. 4, 5 and 6, are mounted upon a laterally reciprocable and vertically movable table 34, and are each made in two complementary halves slidable on the table toward and from each other. For this purpose, the mold 4 is provided with horizontal slide members 35 and 36 and the mold 5 with similar slide members 37 and 38. These slide members are mounted in slideway-forming means 39, 40, 41 and 42 respectively, which are secured to the table 34 by suitable means, such as screws 43. The table 34 is provided on its underside with laterally extending slide portions 44, Fig. 6, which are arranged to slide in dovetailed grooves 45 formed in a support 46. The support 46 has secured thereto a pair of downwardly extending guide rails 47, Figs. 1, 2 and 25, which are adapted to slide in guideways formed in a pair of brackets 48 secured to the lower housing 2 and in a second pair of brackets 49 secured to the base 1.

Means are provided for moving the molds vertically. In this instance the means move not only the molds, but also the table 34 and the support 46. For this purpose the support 46 is provided, Fig. 1, with a pair of depending brackets 50 and 51 in which is journaled a rotatable shaft 52. Rotatably mounted on the shaft 52 intermediate the brackets 50 and 51 is a block 53, Fig. 25. This block is provided with a pair of laterally extending pins 54, Fig. 1, to which are pivoted the bifurcated end portions of a link 55, Figs. 1 and 25. The lower end of the link 55 is also bifurcated and is pivoted to the end of a long lever 56, Figs. 1, 19 and 25. The lever 56 is pivoted at 57, Fig. 1, to the lower housing 2 and at its rearward end is provided with a cam roller 58, Figs. 1 and 19. The roller 58 cooperates with the outer periphery of a continuously rotating cam 59 mounted on the main drive shaft 33. By the means described, the support 46 and the mold table 34 and molds 4 and 5 carried thereby will be moved vertically by the cam 59, the rails 47 sliding in the brackets 48 and 49.

Means are provided for oscillating the mold table 34 to bring the molds 4 and 5 alternately to a central forming position below and in vertical alignment with the nozzle 22. For this purpose, the mold table 34 is provided with a pair of guide members 60, Figs. 4 and 5, arranged at right angles to the guide members 44. Slidably mounted in the guide members 60 is a slide block 61, Figs. 2, 5, 6 and 25, which is rotatably mounted on the upper end of a pin 62. The pin 62 is rigidly mounted in the outer end of a crank arm 63 which is secured by a split collar connection 64 to the upper end of a vertically disposed rotatable shaft 65. The shaft 65 is suitably journaled in bearing members in the support 46, Figs. 2 and 25, and carries at its lower end a beveled pinion 66, which is in mesh with a beveled gear 67 secured to the shaft 52. The ratio of the gear 67 to the pinion 66 is two to one. The shaft 52 also carries secured thereto a disc 68 provided with four radial slots 69, Figs. 1 and 2, this disc being the driven member of a Geneva driving mechanism. Arranged in driving relation to the disc 67 at the lowermost position of the mold table is a driving disc 70 having a single driving pin 71 arranged to enter the slots 69 successively. The disc 70 is mounted on a rotatable shaft 72 which is journaled in a bracket 73 secured to the base 1 at the forward end thereof and also in a bracket 74 secured to the base 1 within the housing 2. At its inner end, the shaft 72 carries a beveled gear 75 meshing with a similar beveled gear 76 mounted on a shaft 77 which is journaled in a bra ket 78 secured to the base 1 within the housing 2. The shaft 77 also carries secured thereto a sprocket wheel 79 which is driven by a sprocket chain 80 from a sprocket wheel 81 secured to the main drive shaft 33, Fig. 1.

The ratios of the sprocket wheels 81 and 79 and the gears 76 and 75 are such that the shaft 72 makes one revolution for each revolution of the shaft 33. Inasmuch as the shaft 33 makes one revolution during the making of each article, the disc 70 will similarly make a single revolution during the making of each article. Further, as there are four slots 69 in the disc 68, the shaft 52 will make a quarter revolution for each revolution of the main drive shaft 33; and as the ratio of the gears 67 and 66 is two to one, the shaft 65 will make a half revolution during each revolution of the drive shaft 33 and hence during the formation of each article, so as to rotate the crank arm 63 through 180° and to oscillate the mold table 34 from one end of its path of movement to the other each time an article is made.

As the Geneva mechanism has its driven member mounted on the vertically movable support 46, it can only be operated to move the mold table laterally during the time the molds are at their lowermost position, which is at the time the molds are in a position such that they will not interfere with other means, including the extrusion nozzle 22, as hereinafter set forth.

Means are provided for opening and closing the molds. For this purpose each of the slides 35, 36, 37 and 38 is provided with a rack, such as shown at 82, Figs. 5 and 6, these racks extending through suitable slots formed in the mold table 34. Meshing with the racks 82 for the slides 35 to 38 respectively are pinions 83, 84, 85 and 86. These pinions are mounted on transversely extending shafts 87, 88, 89 and 90 respectively, all of which are journaled in suitable bearings secured to the underside of the mold table 34. At their outer ends, the shafts 87 to 90 have respectively secured thereto beveled pinions 91, 92, 93 and 94, Fig. 4. The beveled pinions 91 to 94 are respectively in mesh with beveled gears 95, 96, 97 and 98. The gears 95 and 96 are both mounted on a shaft 99 journaled in the left hand end of the mold table 34; while the gears 97 and 98 are similarly mounted on a shaft 100 journaled in the right hand end of the mold table, Figs. 4 and 5. At the forward ends of the shafts 99 and 100 are mounted upstanding crank arms 101 and 102 respectively, which have pivotally connected to their outer ends link members 103 and 104 respectively, Figs. 2, 3 and 25, these link members being connected by a suitable tension spring 105. Thus, the tension of the spring 105 is effective through the mechanism described to tend to close both molds 4 and 5 when such action is permitted by the mold opening means hereinafter to be described.

Means are provided for opening the molds during the time they are respectively out of or away from the central forming position. These means are effective, as shown, to open the molds in response to the vertical movement of the mold table as heretofore described, and particularly in response to the lowering of the mold table after it has been raised.

For this purpose, the rear ends of each of the shafts 99 and 100 are provided with means co-operating selectively with fixed cams 106 and 107, Figs. 2, 4 and 22, the cams being suitably mounted on brackets extending from the lower housing member 2. The means mounted on the shafts 99 and 100 are each similar to the other, but are respectively reversed, as a right and a left hand. These means comprise bell crank levers 108 and 109 respectively secured to the shafts 99 and 100. Pivoted to the bell cranks 108 and 109 are bell cranks 110 and 111 respectively, one arm of each of which carries a cam roller 112 and 113 respectively. It will be understood that the bell cranks 110 and 111 are respectively pivoted on horizontal axes to the outer ends of one of the arms each of the bell cranks 108 and 109. The other arm of the bell crank 108 is connected by a tension spring 114 to the other arm of the bell crank 110; and the second arm of the bell crank 111 is connected by a tension spring 115 to the second arm of the bell crank 109. The tension springs 114 and 115 cause a relative movement of the bell cranks to bring them to the full line positions shown in Fig. 22, such that abutting surfaces of the connected bell cranks are in engagement at 116 and 117 respectively.

Referring now to Fig. 22 and following the operation of the mold opening means through a complete cycle of the operation of the molds, the parts shown in full lines at position A indicate the position of the parts with the mold table at its lowermost and right hand position, as seen also in Fig. 2. During the raising of the mold table, the parts move through position B to position C. During this time, there will be no rotative movement of the shafts 99 and 100, due to the fact that the cam roller 112 does not engage the cam 106 during this period and that the cam roller 113 engages the operative surface 118 of the cam 107, but serves only to rotate the bell crank 111 in respect to the bell crank 109 as indicated in position B, tensing the spring 115 without rotating the shaft 100. Thus, there will be no opening of either mold during the upward movement of the mold table between positions A and C. During the downward movement of the mold table, however, the parts move to position D, which causes a rotation of the shaft 100 to open the mold 5 as the bell cranks 109 and 111 can have no relative movement at this time due to their engagement at the point 117. This is effective to open the mold 5 during the downward movement of the mold table and permit the removal of a completed article therefrom. The mold table then returns to position A, at which time the roller 113 has ridden off the end of the cam surface 118 of the cam 107, permitting the closing of the mold by the spring 105, as above set forth.

The mold table then moves from right to left, as indicated in Fig. 22, from position A to position E, during which time there will be no rotative movement of the shafts 99 and 100, as the cam rollers 112 and 113 do not come into engagement with any cam surface. The molds are again raised for the forming of an article in the mold 5 while an article is rigidifying and being finished in the mold 4. This raising movement occurs going from position E through position F to position G. During this time also there will be no opening of the molds as the cam roller 113 does not engage any cam surface, and the cam roller 112 engages the cam surface 119 of the cam 106, but serves only to cause a relative rotation between the bell cranks 108 and 110 tensing the spring 114, as shown in position F. Again during the downward movement of the mold table following position G, and as shown particularly at position H, there will be a rotative movement of the shaft 99 due to the bell cranks 108 and 110 engaging at the point 116 and causing the opening of the mold 4 to permit the removal of a completed article therefrom. As the mold table moves from position H back to position E, the roller 112 rides off the end of the cam surface 119, again permitting the mold 4 to be closed by the tension spring 105. The mold table then moves from left to right without further mold movement, bringing the parts back from position E to position A, which completes the entire cycle of operation of the parts.

The plasticating means

While I recognize that some plastic materials, which could be used in forming articles in the apparatus and according to the process or processes hereinafter set forth, may be initially in a plastic and moldable condition, so that they may be supplied to the extrusion nozzle and therethrough to the molds without preliminary plasticating or conversion to a fluent and moldable condition, many materials, such as cellulose acetate, must be treated, usually by the application of heat or pressure, or both, to convert them to a moldable state or condition. For this purpose, there is illustrated means 20 in Fig. 1 of the accompanying drawings for subjecting the material, which is usually received in a comminuted solid state to heat and pressure to convert it to a moldable condition and to supply it under a selected pressure to the forming means of the apparatus.

While the plasticating means may take a number of different forms, I have shown in Fig. 1 a means substantially as shown in the patent to Gordon No. 1,935,050, granted Nov. 14, 1933, with which I have worked successfully in the making of bottles by a machine as herein shown and described. Reference may be had to the Gordon patent for a particular description of the construction and operation of the device and its functional advantages, the details of which per se are obviously no part of my present invention. My invention merely includes the use of some means by which the plastic material may be subjected to heat or pressure, or both, to convert it to a plastic and moldable condition.

Referring now to Fig. 1, the means shown comprises a casing 120 which is mounted on the support 21, the latter in turn being supported either upon some suitable outside support or in a manner (not shown) by the support 10, as above set forth. Within the casing 120 is a rotatable screw member 121, which is suitably mounted in bearing members (not shown) and suitably driven by any desired driving mechanism, which preferably is operated at a speed proportioned to the speed of operation of the remainder of the apparatus. A supply hopper 122 is provided for the introduction of material to be plasticated into the casing 120, where it is acted upon in a first stage portion 123 and thereafter in a second stage portion 124, there being by-passes 125 through which the material must flow between these two stages. The by-passes are controlled by adjustable deflector members 126, each of which is provided with a screw adjustment as generally indicated in the drawings. From the second stage 124, the material passes to a tapering conical passage formed between a tapering head 127 of the screw 121 and a tapering casing, each of which may be provided with suitable flutes or ribs for exerting a mixing and grinding action on the material.

The casing 120 is provided adjacent to the inlet opening of the hopper with a temperature controlling chamber 128, which is usually supplied with a cooling fluid so as to prevent the material becoming sticky before it is desired. Further along and adjacent to the second stage 124, there is a temperature controlling chamber 129; while in the tapering portion of the casing surrounding the tapered head 127 of the screw are temperature controlling chambers 130 and 131. These chambers may be supplied with cooling or heating fluids as may be desired or necessary in order to bring the plastic material to a desired condition, it being understood that the compression and grinding action effective on the material will generate a certain amount of heat therein. An adjusting screw 132 is provided to control the longitudinal position of the casing 120 in respect to the tapered head 127 and thus to control the clearance therebetween so as to control the amount of pressure effective on the material during its plastication. The screw 121 is also made hollow and is provided with a central pipe 133 terminating within the hollow head 127 for the passage of a temperature controlling fluid through this screw. It will be understood that any suitable means (not shown) may be provided for supplying temperature controlling fluids to and withdrawing them from the several temperature controlling chambers of the plasticating means and that these fluids may be at the same or any different temperatures for the several temperature controlling chambers as may be needed in order to bring the material to a desired moldable condition and desired viscosity condition as influenced by temperature. The tapered casing portion surrounding the tapered head 127 is preferably suitably secured to a plastic material chamber 134 forming a part of the support 10, or suitably secured thereto, this chamber having an entrance passage 135, as shown in Figs. 1 and 14.

Extrusion nozzle and means for extruding the plastic material therethrough

The extrusion nozzle 22 is best illustrated in Figs. 13 to 16 in its main form and comprises inner and outer nozzle members, generally indicated at 136 and 137 respectively, which are spaced to provide a tubular passage 138 therebetween for plastic material to flow therethrough, this space being substantially a hollow cylindrical passage wihch tapers as shown to a reduced thickness adjacent to the lower end, Figs. 14 and 15. The inner and outer nozzle members are spaced apart by suitable spacing means 139 at the upper and lower ends of the nozzle, Figs. 14 and 16. The outer nozzle member 137 is formed of two substantially cylindrical sleeve portions sealed together at their ends and spaced apart therebetween to provide a temperature controlling chamber 140. These portions are both mounted in a lower head 141 secured to the plastic material chamber 134 and are arranged to be moved thereby as hereinafter set forth.

Means are provided for supplying temperature controlling fluid to and removing it from the chamber 140, comprising pipes 142 and 143, which may lead to and from a suitable source of a fluid at a desired temperature.

Means are provided for insuring that the fluid supplied to the chamber 140 will pass to the bottom end of the chamber at the discharge end of the nozzle, comprising baffle members 144, Figs. 15 and 16, which terminate at 145 adjacent to the lower or discharge end of the nozzle. Thus, the temperature controlling fluid which may enter through the pipe 142 must pass down on one side of the nozzle around the lower ends 145 of the baffle members 144 and thence upwardly on the other side of the nozzle and out through the pipe 143.

Figure 13:
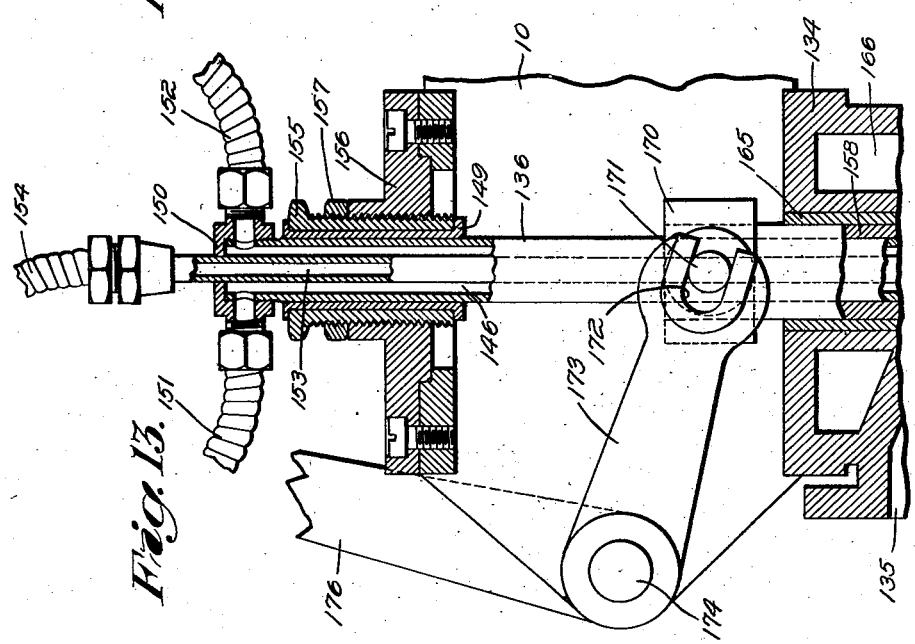
Fig. 13 is a fragmentary detail view substantially in vertical section showing the mounting of the plunger of Fig. 12 and certain of its operating means in conjunction with the support for the inner nozzle member.

The inner nozzle member 136 is arranged to be slidable within the outer nozzle member and may be either adjustable therein, as shown in Figs. 13 and 14, or may be moved therein during the forming of each article, as shown in Fig. 20.

Referring first to Figs. 13 and 14, the inner nozzle member comprises a pair of spaced substantially cylindrical shells which are joined at their lower ends at the discharge end of the nozzle to provide therebetween a temperature controlling chamber 146, similar to the chamber 140. This chamber is similarly divided by a pair of baffle members 147, the lower ends 148 of which are spaced a short distance from the lower end of the chamber 146, Fig. 15. The inner nozzle member is supported at its upper end in a sleeve 149, Fig. 13, and has the inner and outer cylindrical members thereof sealed together at their uper ends at 150.

Means are provided for supplying temperature controlling fluid to and removing it from the inner nozzle member, comprising pipes 151 and 152 arranged to enter the opposite sides of the upper end of the member as shown, so that the temperature controlling fluid which may enter through the pipe 151 must pass through the chamber 146 down to the lower ends 148 of the baffles 147 and thence up the other side to the pipe 152. In this way the plastic material passing through the passage 138 of the nozzle is controlled as to temperature both internally and externally during its passage through the nozzle to control the viscosity thereof, which is important in the case of many plastic materials, particularly thermoplastic materials.

The central tube forming the inner nozzle member also forms a central air passage 153, which is open at the lower end of the nozzle as shown, and which is connected at the upper end of the nozzle, Fig. 13, to a flexible pipe 154, through which the pressure within the nozzle and hence the pressure effective in expanding the articles of plastic material within the molds may be controlled as desired, as hereinafter set forth.

It is often desirable that the inner nozzle member be adjustable with respect to the outer nozzle member, especially when using an outer nozzle member having an inwardly tapering lower end, as shown in Fig. 20. Means are provided, therefore, for effecting this adjustment and for locking it in adjusted position when made.

For this purpose, the inner nozzle member, which as above set forth is supported by a sleeve 149, has rotatably arranged around this sleeve an externally threaded nut member 155. The sleeve has its ends flanged or is otherwise suitably provided to prevent endwise movement of the nut member 155 in respect to the inner nozzle member. This nut member is threaded in a member 156, which is rigidly secured to a part of the bracket 10. Thus, the inner nozzle member may be vertically adjusted with respect to the outer nozzle member by rotating the nut member 155. This adjustment may be secured, once it has been made, by a suitable lock nut 157 threaded on the nut member 155 and arranged to be tightened against a boss on the member 156.

Means are provided for extruding plastic material from the nozzle 22 under a pressure which is independent of any pressure effective on the material in plasticating it in the means 20, or other equivalent means, as above set forth. For this purpose, there is provided a reciprocable plunger 158, Figs. 12, 13 and 14, arranged for movement axially of the nozzle in a chamber 159 which is in effect an axial prolongation of the plastic material passage 138, but is separated therefrom by a wall 160. The chamber 159 communicates with the inlet passage 135 for plastic material through a rotatable valve 161, Fig. 14, which is movable to a position to permit the flow of plastic material from the passage 135 into the chamber 159 and also to cut off that flow. The chamber 159 also communicates through a passage 162 controlled by a second rotatable valve 163 with a lateral extension 164 of the plastic material passage 138. As shown in Fig. 14, the valve 163 is in a position to cut off communication between the chambers 159 and 138 through the passage 162, but it may be rotated to permit flow of plastic material through this passage on the downward movement of the plunger, as hereinafter set forth.

The chamber 159 is formed within a sleeve member 165, which is in turn rigidly secured within a bore in the plastic material chamber 134. Surrounding the wall portion of the chamber 134 in which the sleeve member 165 is secured is a temperature controlling chamber 166, through which a temperature controlling medium may be passed through suitable pipes indicated in Fig. 2 at 167 and 168.

Means are provided for reciprocating the hollow cylindrical plunger 158 for forcing plastic material outwardly through the passage 138 and for extruding it from the orifice 169 of the nozzle. For this purpose, the plunger 158 has a collar 170 at its upper end, Figs. 7, 12 and 13, which is provided with laterally extending studs 171. These studs are received in slots 172 in the outer bifurcated end portions of a crank arm 173. The arm 173 is mounted on a transverse shaft 174, which is journaled in bearings 175, Figs. 2 and 3, formed in brackets extending from the supporting member 10. At its left hand end, as seen in Figs. 2 and 3, the shaft 174 has secured thereto an actuating arm 176, which is pivoted at its upper end at 177 to a block 178. The block 178 is slidable on a rod 179, portions at least of which are threaded to receive pairs of lock nuts 180 at points spaced from the normal position of the block 178. Extending between the pairs of lock nuts 180 and the opposite sides of the block 178 are relatively heavy compression springs 181. The rod 179 is provided at its left hand end, as seen in Fig. 12, with a bearing portion 182 pivotally connected to a slide member 183. This member is mounted for sliding movement in guides 184, which are carried by one end of a shaft 185. Adjacent to the slide members 184 and stationarily mounted on a bracket 186 secured to the upper end of the bracket 9 is a stationary cam 187 having a closed cam track 188 formed therein and arranged to receive a roller 189, which is carried by the slide member 183.

The shaft 185 is suitably journaled in the bracket 186 and in a second bracket 190, Fig. 3, which is also secured to the upper end of the bracket 9. This shaft carries intermediate its bearings a spur gear 191, Figs. 1, 2, 3 and 21, meshing with a gear 192 rotatably mounted on a short stub shaft 193, which is also secured in a part of the bracket 186. Also arranged for rotation around the shaft 193 and secured to the gear 192 for rotation therewith is a beveled gear 194, which is arranged to mesh with and be driven by a beveled gear 195, mounted for free rotation around the upper end of the shaft 8. Also rotatably mounted around the shaft 8 and secured to the beveled gear 195 for rotation therewith is a spur gear 196, the teeth of which are elongated as shown in Fig. 1. Meshing with and arranged to drive the gear 196 is a spur gear 197, which is secured to the upper end of a vertically extending shaft 198, Figs. 1, 3, 7 and 8, suitably journaled in the upper housing 3. At its lower end, the shaft 198 carries a beveled gear 199 meshing with a complementary beveled gear 200 mounted on a transversely extending shaft 201, which is journaled in suitable bearings mounted in the sides of the upper housing 3. At its outer end, at the right as seen in Fig. 2, the shaft 201 carries a sprocket wheel 202, Fig. 1, which is driven through a sprocket chain 203 from a sprocket wheel 204 mounted on the main drive shaft 33 of the machine.

The ratio of the several driving connections just described is such that the shaft 185, which is the main cam shaft at the upper portion of the machine, makes one revolution for each revolution of the shaft 33. Thus the cam shaft 185 also makes a single revolution for each article formed. Turning now to Fig. 12, it will be seen that if the cam track 188 were circular, so that the cam roller 189 traveled in a true circular path, the pivotal point between the bearing portion 182 and the slide 183 would also travel in a circular path and would impart a straight crank movement through the mechanism described to the plunger 158, which would be moved in a manner at least approximating simple harmonic motion. In view of the fact that it is desired that the rate of extrusion of the plastic material be varied to some extent at different parts of the stroke of the plunger in forming articles, so as for example to provide different wall thicknesses at different parts of the bottle and to compensate for variations in the diameter thereof at different levels, the shape of the cam track 188 is non-circular in order to impart a desired motion to the plunger 158. The function of the springs 181 is to prevent breakage of the parts if the plunger should meet an obstruction which could not be easily moved. Furthermore, by adjusting the pairs of lock nuts 180 nearer to or farther from the block 178 on the rod 179, the compression of the springs 181 may be varied so as to vary the maximum pressure effective on the plunger during its motion in extruding the plastic material from the nozzle.

It may also be desired to vary the character of the movement or the degree of movement of the plunger 158 for making different articles. For this purpose, the cam disc 187 is made interchangeable and is removably mounted upon the bracket 186 by means of a plurality of screws 205, Fig. 12.

*Measuring and controlling the flow of the plastic material into the nozzle*

As above set forth in describing Fig. 14, the flow of plastic material into the nozzle is controlled by rotatable valves 161 and 163. Means are provided for rotating these valves simultaneously so as to bring them to the position shown in Fig. 14 during the retractive movement of the plunger to permit the flow of plastic material from the source thereof, which in this case is the plasticator 20, into the space 159 being vacated by the plunger during its retraction. This in effect serves as a measuring space for measuring and segregating an amount of plastic material equal to that used in the formation of a single article. This plastic material is thereafter extruded into the plastic material passage 138 of the nozzle, which may have a capacity greater or less than the amount of material used in forming a single article. At the time plastic material is to be extruded from the nozzle, the valve 161 is closed and the valve 163 opened to permit a flow of plastic material under the forward or downward movement of the plunger 158 through the nozzle, so as to extrude the plastic material from the orifice 169 thereof.

For operating these valves, they are provided at their outer ends with pinions 206 for the valve 161 and 207 for the valve 163, Figs. 1, 2 and 3, these pinions meshing with one another as shown, so that the valves will be rotated simultaneously. One of these rotatable valve means, in the present instance the shaft for the valve 161, is provided at its outer end with a crank arm 208 which is pivotally secured to a rod 209. The upper end of the rod 209 is slidable in a block 210 and is threaded to receive at points spaced from this block pairs of lock nuts 211. Between the pairs of lock nuts 211 and the opposite sides of the block 210 and surrounding the rod 209 are arranged compression springs 212, in a manner similar to the mechanism previously described for operating the plunger 158. Pivoted to the block 210 and also to a bracket 213 extending from the bearing bracket 190 is a rocker arm 214, which has a cutout portion, as seen in Figs. 3 and 21, in which is pivoted a cam roller 215. This roller cooperates with a cam 216 on the end of the cam shaft 185 opposite that end carrying the slideways 184. A tension spring 217 connects a point on the rocker arm 214 spaced from its connection to the bracket 213 with a suitable anchorage.

Thus, the cam 216 will be effective to move the rocker arm 214 in a clockwise direction as seen in Fig. 1 about its pivotal connection to the bracket 213 against the tension of the spring 217 to move the rod 209 upwardly and thereby to rotate the valve 161 in a counterclockwise direction, and the valve 163 in a clockwise direction. Return movement of these valves to their initial positions may be effected when the roller 215 rides onto a low portion of the cam 216 and under the control of the tension spring 217. The arrangement is such that the valves may be moved between the position shown in full lines in Fig. 14 and a position in which the valve 161 is closed and the valve 163 open.

It will be noted that the plasticating means illustrated in Fig. 1 at 20 is continuous in its operation, while the means for utilizing the material, i. e., the nozzle and the plunger 158 for extruding the material therethrough is intermittent in character. In order to accommodate plastic material which may be built up in the plastic material passage 135 during the time the valve 161 is closed, a chamber 218, Fig. 1, is provided in communication with this passage and has therein a spring-pressed plunger 219 which is adapted to yield to accommodate this excess material during the time the valve 161 is closed and to deliver this material through this valve to the space 159 when the valve is again opened.

It will be further understood that while I have shown and described an arrangement by which plastic material is supplied through the nozzle at a pressure separate and distinct from the pressure effective on the material in plasticating it, including the provision of the plunger 158 and its operating means, and further have described a means for periodically stopping and for measuring the plastic material supplied to the nozzle, including valve members 161 and 163, it is possible to use the device with the plunger 158 locked in a stationary position and with the valves 161 and 163 omitted or both open. Under these circumstances, the pressure effective to move the material through the nozzle is that imparted thereto by the plasticating means which will then feed directly to and through the nozzle. Such a construction is to be considered within the purview of this invention.

*Shearing and associated means*

There may be provided surrounding the lower end of the nozzle 22 a heating housing 220, Figs. 1, 2 and 8, which is mounted for vertical sliding movement on and in respect to the bracket 9 by the provision of guide portions 221 on the member 220 vertically slidable in guideway forming members 222 on the lower end of the bracket 9. It is normally desired that the heating housing 220 have no vertical movement during the vertical movement of the bracket 9, as hereinafter set forth. For this reason, the housing 220 has a rearwardly extending grooved member 223 formed as a yoke as shown in Figs. 1 and 8, which is adapted to engage above and below a stationary tongue member 224 projecting outwardly from the lower bracket 7. This type of connection permits the swinging of the bracket 9 and parts carried thereby between the full and dotted line positions, Fig. 7, and also permits the vertical movement of the shear as hereinafter set forth.

The member 220 is further provided with a pair of temperature controlling chambers 225 and 226 at its rear portion and other temperature controlling chambers 227 and 228 at its forward portion. Means shown as pipes 229, Fig. 2, may be provided for the supplying and withdrawal of temperature controlling fluid to and from the chambers 227 and 228. Suitable means (not shown) may be similarly provided for supplying and withdrawing temperature controlling fluid to and from the chambers 225 and 226. In one process of operating the device for making articles, such as bottles, the molds 4 and 5 are alternately raised upwardly to a certain extent within the member 220 along with certain means arranged above the molds and presently to be described. The heat supplied to this member 220 prevents undesired cooling of certain at least of these parts.

Above the molds when they are respectively at the forming position is a shear housing 230, Fig. 9, this housing being secured to a threaded sleeve member 231 which carries at its upper end a heating housing 232. The housing 232 provides a hollow chamber 233 to and from which temperature controlling fluid may be passed through suitable flexible connections, not shown. The housing 230 is also provided with suitable buttons 234 having stems inserted in bores therein for supporting the outer end portions of the housing 232.

Means are provided for supporting the housings 230 and 232 during the time the molds are at their lowermost position, including the time the molds are being shifted laterally, as shown in Fig. 29. For this purpose, the housing 232 is provided adjacent to its forward end with brackets 235 and 236, Figs. 8 and 9, which are adapted to rest upon inwardly extending brackets 237 and 238 respectively secured to the inside of the housing 220. The rear end of this assembly may be supported at this time upon downwardly extending brackets 239 and 240, Figs. 9 and 11, which engage beneath the rearwardly extending portion of the shear housing 230, these brackets depending from the rear portion of the housing 220.

Also arranged to be supported from the shear housing is a neck ring member 241, which is arranged to cooperate with each mold during the forming of an article therein. This neck ring member has securely threaded therein a plurality of screws 242, Figs. 9 and 10, which pass loosely through bores in the housing 230 and have their heads supported by the shoulders in these bores at the lowermost relative position of the neck ring member 241 in respect to the housing 230. The undersides of these bores are countersunk to accommodate compression springs 243 surrounding the screws 242 and tending to urge the neck ring away from the housing 230, when this action is permitted by the molds being in their lowermost position or at least low enough to permit the expansion of the springs. The springs are of such resiliency, however, that they will be compressed by the weight of the housings 230 and 232 and parts carried thereby, so that upon the upward movement of the molds from the position shown in Fig. 9, toward a position such that the nozzle 22 may penetrate a desired part of the way into the then associated mold, the springs 243 are compressed so that an upwardly extending flange 244 surrounding the opening in the neck ring 241 engages a downwardly extending flange 245 on the underside of the housing 230, as shown in Fig. 14, while at the same time a button 246 secured in the housing 230, will engage an upwardly extending portion 247 which may be integral with a hub 248 of the associated mold. The other hub 248 on the other mold half (at the right as seen in Figs. 9 and 14), has an upwardly extending portion 249 arranged to engage the underside of a plate 250 secured to the housing 230, Figs. 9 and 10. Thus, when the mold is moved upwardly until the flanges 244 and 245 engage and until the portions 247 and 249 engage with the adjacent portions secured to the housing 230, as shown in Fig. 14, the mold cavity is so positioned in respect to the opening in the housing 230 through which the plastic material may be extruded and/or through which the nozzle 22 may be inserted into the mold, that an article may be formed and the mold parts will be in substantially air-tight relation for a purpose which will be brought out hereinafter.

After the completion of the formation of an article in the mold, by a process as hereinafter set forth, the mold is moved downwardly first to move it in respect to the nozzle a sufficient distance so that the nozzle is in a position in respect to the mold about as shown in Fig. 9, if it has previously been inserted into the mold as shown in Fig. 14, and further until the weight of the housings 230 and 232 and associated parts is supported by the housing 220, as above set forth, so as to permit the expansion of the springs 243 and to open a slight space between the flanges 244 and 245 as shown in Fig. 9. During all this time, the article formed in the mold remains integral with the parent body of plastic material within the nozzle.

The next operation is to sever this article from the parent body of plastic material. For this purpose, there is provided a shear, which in the present instance comprises a single shear blade 251, Figs. 9, 10 and 11. This blade may have its forward or cutting edge of the shape shown in Fig. 10 to provide a central point 252 and reentrant cutting portions 253 tapering away therefrom. When this blade is moved to the left, as shown in Fig. 9, the point 252 first penetrates the wall of plastic material at one side and in the space between the flanges 244 and 245, the cutting thereafter progressing from this point circumferentially around the annular wall of plastic material in both directions.

The shear blade 251 is mounted for horizontal sliding movement within the housing 230 and is secured to a slide member 254 having laterally extending lugs 255, Fig. 10, arranged in grooves in the housing and positioned between compression springs 256 and abutments 257. The arrangement is such that the springs 256 tend to move the blade so that the lugs 255 are forced against the abutments 257 and the blade is hence urged toward its inoperative position in which it is not across the underside of the nozzle.

In order to permit of the vertical movement of the molds to a point such as that shown in Fig. 14, in which the nozzle extends a predetermined desired distance thereinto and to permit of the vertical movement of the housings 230 and 232 and the neck ring 241 with the mold, the shear operating means, which do not partake of this vertical movement of the mold, are arranged to be connected to the shear only at the lowermost position thereof. For this purpose, the member 254 is provided at its rear end with a hook shaped portion 258 arranged at the lowermost position of the shear housing to be engaged by a complementary shaped actuating member 259, which forms the outer end of a thrust rod 260. Furthermore, the rear portion of the housing 220 is provided with an upwardly extending slot and the member 223 is formed as a yoke to permit space for the vertical movement of the portion 258 of the shear.

The means for actuating the shears comprise a means for moving the thrust rod 260 in opposite directions. For this purpose, the thrust rod 260 is formed as the piston rod of a piston 261, Figs. 9 and 10, slidable in a cylinder 262, which is formed in a bracket 263 secured in turn upon a housing 264 carried by the lower housing 2, Figs. 1 and 9. The housing 264 may also be employed to support the cams 106 and 107 for opening the molds as aforesaid. A compression spring 265 is positioned within the cylinder 262 in rear of the piston 261 and is confined in this cylinder by a plug 266 threaded in the rear end of the cylinder, this spring tending at all times to move the piston 261 outwardly in the cylinder and thus to move the shear blade across the orifice in its shearing movement when this action is permitted. For compressing the spring 265 and controlling the movement of the piston 261, the latter is provided with a pair of laterally extending studs 267 projecting through suitable slots 268, Figs. 1 and 10, in the sides of the cylinder 262, and arranged to be engaged outside the cylinder by the bifurcated end portions of a lever 269. The lever 269 is pivoted at 270 in the housing 264 and has its opposite end formed as a cam follower cooperating with a rotatable cam 271. The cam 271 is secured to a transversely extending shaft 272, which is journaled in the sides of the housing 264 and carries at its outer end, Fig. 1, a sprocket wheel 273 which is driven by a sprocket chain 274 from a sprocket wheel 275 secured to the main drive shaft 33.

Thus, it will be seen that when either mold and the shear housing 230 associated therewith are at any position above that shown in Fig. 9, the shear will necessarily be in its retracted or inoperative position under the influence of the compression springs 256. When, however, the parts are brought to the position shown in Fig. 9, so as to engage the portions 258 and 259 and the spring 265 is compressed due to the lower end 276 of the lever 269 riding around on the high diameter portion 277 of the cam 271, the shear is in readiness to be moved to sever an article from the parent body of plastic material within the nozzle. This action occurs when the cam follower portion 276 of the lever 269 passes off the shoulder 278 of the cam 271, permitting the spring 265 to thrust the shear blade forwardly against the compression of the springs 256 and to sever an article as aforesaid. The inclined portion 279 of the cam 271 is operative thereafter again to load the spring 265 in readiness for the next shearing operation.

End closing means

After the plastic material has been formed into an article and that article severed from the parent body thereof within the nozzle, it is necessary to close the end of the tubular body of plastic material in the passage 138 of the nozzle in some suitable way, so as to form a closed-ended hollow body of plastic material before the material may be expanded in the making of the next succeeding hollow blown article. This may be effected in a number of different ways, which will now be set forth.

One way of closing the end of the hollow body of plastic material is to extrude a small amount of the material in tubular form from the nozzle and before the mold is at its upper position to close the space between the upper end of the mold and the nozzle, to cut a small portion of the end of the tubular body of plastic material from the remainder with a pair of hand scissors or shears. This causes the end portion of the tubular body being extruded to be closed together and to weld in view of the cohesive character of the plastic material, so that the closed-ended body may thereafter be extruded and expanded by internally applied pneumatic pressure to conformity with the mold cavity. I have had some experience with this process and have made bottles successfully in this way.

Another possible method of closing the end of the tubular body of plastic material being extruded from the nozzle is to move the mold upwardly to such an extent that the lower end of the nozzle projects almost into contact or even into contact with the bottom of the mold cavity. When under these circumstances the plastic material is extruded from the nozzle in tubular form, it will mushroom against the bottom of the mold and weld itself into a closed-ended body. Thereafter the mold may be gradually moved downwardly so that in effect the nozzle is gradually withdrawn from the mold; and during this time the plastic material may be extruded from the nozzle and expanded by the application of pneumatic pressure through the air passage 153 of the nozzle. This manner of operation is taught generally in my copending application, Serial No. 658,486, now Patent No. 2,128,239 granted Aug. 30, 1938, of which the present case is a continuation in part, as above set forth.

The plastic material may also be closed prior to the mold and nozzle moving relatively to the point where the nozzle moves to the bottom of the mold and in fact may be effected when operating according to a process in which the nozzle does not enter the mold cavity at all. This last operation is advantageous for certain purposes and may employ the shear blade itself as a baffle against which the plastic material may be extruded for closing the end thereof by a mushrooming action, similar to the action which takes place when the nozzle is adjacent to the bottom of the mold. For this purpose, the shear blade may be held across the bottom of the nozzle by the provision of a low portion 280 of a desired extent on the cam 271, Fig. 9. Under these circumstances, the end will be formed as shown in Fig. 26 against the shear blade, which, due to the thin material of which it is made, will not extract an amount of heat from the plastic material in contact therewith, but that the material may thereafter be expanded to form a suitable bottom for the hollow article to be formed. In order to lift the material off the shear blade to permit the retraction of the latter after a bottom has been formed in conjunction therewith, as just described, two means may be used alternatively or conjointly. In the first place, a vacuum may be established within the air passage 153 of the nozzle causing the center portion of the end-closing part of plastic material to raise, as shown at 281, Fig. 26. The other way which may be used in conjunction therewith if desired is to raise the nozzle and its associated parts off the shear so as bodily to raise the end-closing portion of plastic material from the shear blade, as shown in Fig. 29.

For this purpose, the nozzle and all associated parts carried by the bracket 9, are vertically movable in respect to the shear blade 251 which is held against movement in a vertical direction with respect to the stationary parts of the machine by resting on its supports on the housing 220, the latter being prevented from moving by the connection 223—224, Figs. 1 and 8. For moving the bracket 9 and parts carried thereby vertically, this bracket is secured to the shaft 8 so that vertical movement of the shaft will result in vertical movement of the nozzle 22 secured thereto, as above set forth. For this purpose, the shaft 8 is threaded and provided with a pair of lock nuts 282, Figs. 1 and 7. Below these lock nuts are arranged a pair of rollers 283 mounted on the outer bifurcated end portions of a lever 284, which is pivoted at 285 to the upper housing 3. The other end of the lever 284 carries a cam roller 286 cooperating with a cam 287 mounted on the shaft 198, which is driven as above set forth from the main drive shaft 33 of the machine. Thus, when the cam roller 286 rides under a downwardly extending portion of the cam 287, the lever 284 will be rocked in a clockwise direction, as seen in Fig. 1, to raise the shaft 8 and the parts carried thereby, including the nozzle 22, so as to raise the end-closing portion of plastic material off the shear blade 251, as shown in Fig. 29.

Alternative forms, Figs. 17 and 18

In these figures, there is shown an alternative form of nozzle including an outer nozzle member 137a which may be substantially the same as the outer nozzle member 137, while the inner nozzle member 136a is not provided with any temperature controlling means, but is formed of a single tube having a flared lower end, which as shown is substantially complementary to the flared lower end of the outer nozzle member 137a. Such a construction may be satisfactory with material which may be adequately controlled as to temperature from the outside only. With other material which may be even more insensitive to temperature, it is sometimes possible to dispense with the temperature controlling means of the outer nozzle member also in a manner which will be obvious from the foregoing description, but which is not illustrated herein.

As shown in these figures, the end of the hollow tubular body of plastic material is closed at 288 above a shear blade 251, which may be the same as that previously described and may be freed from the shear blade to permit the retraction thereof in any of the ways heretofore disclosed. Thereafter the nozzle may be inserted into the mold while extruding plastic material therefrom, as shown in full lines in Fig. 18, the nozzle moving to the dotted line position shown in that figure and thereafter sufficient pressure being applied within the closed-ended body of plastic material to expand it against the walls of the mold, as illustrated in dotted lines. Thus, according to the process here illustrated, the plastic material may be extruded from the nozzle during the movement thereof into the mold, or as shown in the preceding figures, during the upward movement of the mold to a desired extent surrounding the nozzle. It is noted further that the mold shown in these figures is slightly different in shape from the mold shown in the other figures. The shape of the mold, however, is per se no part of the present invention, which is broad enough to cover the forming of articles of many different shapes and sizes.

Alternative form of Figs. 20 and 21

In these figures, there is shown a further alternative form for the nozzle in which an outer nozzle member 137b is formed with its lower end converging as shown at 289 to provide a restricted orifice 290, the diameter of which is less than the inside diameter of the outer nozzle member 137b at points above the restriction and is less than the outer diameter of the inner nozzle member, here shown at 136b.

With the inner nozzle member 136b in the retracted position shown in the figure, the plastic material being extruded through the passage therebetween may be caused to flow confluently to form a closed end within the outer nozzle member, so that when the material is later extruded, it will be extruded as a closed-ended hollow body. This is particularly advantageous in forming articles from certain types of plastic materials and has been used with considerable success. The closing of the end in this case may be assisted by the establishment of a vacuum within the air passage 153 of the inner nozzle member to bring the material to substantially the shape shown in full lines, Fig. 20, the small portions indicated in dotted lines illustrating the manner in which the plastic material is later extruded as a tubular body from the nozzle.

This figure shows a further modification in which the shear blade shown in Figs. 9, 10 and 11 is eliminated by forming a shearing means between the inner and outer nozzle members, the inner nozzle member having a shearing end portion 291 for this purpose, which is cooperable with the orifice-forming portion of the outer nozzle member upon the relative movements of the nozzle members in such direction that their ends approach each other.

Means are provided for effecting such a relative movement, in the present case by moving the inner nozzle member vertically so as to cause the lower end thereof to shear the plastic material in conjunction with the outer nozzle member at a substantially circular shear line. For this purpose, the inner nozzle member 136b is slidably mounted in a member 156a corresponding generally to the member 156, Fig. 13. At its upper end the inner nozzle member is provided with a collar 292 having a pair of studs 293 thereon connected by links 294 to the outer end of a lever 295 to which these links are pivoted. The lever 295 is pivoted intermediate its ends at 296 to a bracket 297, which may be secured to the upper end of the bracket 9. At its inner end, the lever 295 carries a cam roll 298 adapted to ride in a closed cam track 299 of a rotating cam 300, which is mounted on the cam shaft 185.

Thus as the shaft 185 rotates one revolution for each article made, it will be seen that the inner nozzle member will be given a properly synchronized reciprocatory motion to cause it to shear the plastic material at the discharge end of the nozzle in timed relation with the other operations of the device.

When operating with a nozzle of this character, however, it will be necessary to cut out a portion of plastic material connecting that portion which it is desired to use in the forming of the lip of a bottle from the portion at which the shearing is effected. This may be done in any suitable manner (not shown).

*Pneumatic pressure control for nozzle*

As above set forth, the nozzle is provided with selected different pressures through the passage 153, from the pipe 154. This pipe leads to a port 301 of a valve, generally indicated at 302, Figs. 2, 3, 21 and 23. This valve may be of any desired character or may comprise a plurality of valves for effecting the desired results, as hereinafter set forth. In the present instance, however, I have chosen to show a rotary valve, including a rotatable valve member 303, Figs. 23 and 24, which is enclosed within a casing formed of portions 304 and 305 secured together in a suitable manner as by bolts 306. The rotatable member 303 is mounted on a shaft 307 which passes through a suitable gland packing 308 and is provided outside the casing 304 with a sprocket wheel arranged to be driven through a suitable sprocket chain 309, Fig. 3, from a similar sprocket wheel on the shaft 185. As the sprocket wheels about which the sprocket chain 309 passes are of the same diameter, the rotatable member 303 of the valve will be given one complete revolution for each article formed in the machine.

The port 301 of the valve communicates with an annular chamber 310 in the casing portion 304, one side of which is closed by the rotatable member 303. This member has three ports therein numbered 311, 312 and 313 and respectively adapted for transmission of atmospheric pressure, vacuum, and superatmospheric pressure. These ports are located at different radial distances from the center of rotation of the member 303 and are arranged to register at suitable times with ports 314, 315 and 316 respectively in the inner wall of the valve casing portion 305. These ports are respectively connected to the atmosphere, to a source of vacuum and to a source of superatmospheric pressure in a suitable manner (not shown). The function of the valve in establishing the different pressures within the extrusion nozzle is in part explained above and will be more fully discussed in describing the operation of the entire machine.

In Figs. 20 and 21, the valve 302 is somewhat differently located from the location thereof in the preceding figures in order to provide clearance for the means for moving the inner nozzle member 136b. This valve is, however, merely changed as to its location and comprises the same elements operated in the same manner.

*Temperature controlling means for molds*

Means are provided for controlling the temperatures of the molds 4 and 5 in order to control the rigidification of the plastic material therein, once it has been formed as aforesaid, by extrusion and expanding to conformity with the mold cavity. In the case of thermoplastic materials, the temperature controlling means will usually be used to extract heat from the plastic material and will comprise the circulation of a cool temperature controlling fluid through a cavity formed in the mold walls. With thermosetting materials on the other hand, it may be necessary to supply heat to the molds in order to effect the rigidification of the material. Under any circumstances, the temperature controlling means will be effective to control the temperature of the molds to a desired point, which will be governed by the characteristics of the plastic material being worked.

As shown in Figs. 4 and 9, the mold halves are formed with hollow walls to provide temperature controlling chambers 317 which are provided with inlet and outlet passages for temperature controlling fluid, including upper passages 318 formed in the projections or hubs 248 and lower passages 319 (see also Figs. 14 and 20), communicating with the chambers 317 adjacent to their lower ends. These passages or ports may communicate with a suitable reservoir or circulating system for a temperature controlling fluid through flexible pipes 320 and 321 respectively, Fig. 4.

*Controlling back pressure in molds*

It is often important in forming hollow blown articles from organic plastic material to control the back pressure within the mold in which such article is being blown, by which is meant the pressure existing within the mold cavity between the expanding body of plastic material and the walls of the mold cavity.

For this purpose, the molds are formed with grooves, as shown at 322, Figs. 26 to 28 and 30 to 32, in their mating side walls, which grooves register to form substantially vertically extending passages in the walls between the tops and bottoms of the molds. These grooves are in communication with the mold cavity throughout substantially the entire vertical extent of the molds by slightly relieving the mold surfaces 323 intermediate these grooves and the mold cavity. This relief in the side walls is not enough, however, to form such a substantial crevice in the sides of the mold cavity as would permit the passage of plastic material thereinto to form a visible seam on the sides of the articles formed in the molds, but is sufficient to permit the introduction or exhaust of air between the mold cavity and the grooves 322. The groove 322 further terminate at their upper ends in an annular groove 324 which communicates with the portion of the mold cavity between the mold and the neck ring 241. At their lower ends, the grooves 322 communicate with an annular groove 325, formed in the lower inclined surfaces of the mold halves. Thus, the grooves 322 are in communication with the entire mold cavity and may not be blocked off by the partial expansion of plastic material within the cavity, as shown for example in Fig. 27.

The molds 4 and 5 are each provided with a bottom plate 326, Figs. 4, 9, 14 and 20, which serves its usual function in completing the defining of the mold cavity. The bottom plates 326, of which one is provided for each of the molds 4 and 5, are provided with downwardly extending studs 327 adapted to be removably seated in suitable apertures in the mold table 34.

The bottom plates are similarly provided with an annular groove 328 registering with the annular groove 325 in the mold halves at the closed position of the mold to form an annular passage at this point. This passage communicates through a pair of downwardly inclined ducts or bores 329, within each bottom plate, with a transverse passage 330, Fig. 4, which in turn communicates through a pipe 331 with suitable means by which the back pressure within the mold may be suitably adjusted or controlled.

For a substantially universal machine adapted for use with a large number of different types of plastic materials, I may alternatively employ a positive back pressure within the mold, a vacuum within the mold, or a controllably vented pressure communicating with the atmosphere and with the venting of the back pressure under a suitable control. As shown at the right in Fig. 4, the pipe 331 communicates through a four-way fitting 332 with a pipe 333 to superatmospheric pressure, a pipe 334 communicating with the atmosphere and a pipe 335 communicating with a source of vacuum. These pipes are respectively controlled by suitable adjustable valves 336, 337 and 338.

While I have shown these pipes as arranged closely adjacent to the mold and having manually adjustable valves in connection therewith, I contemplate that the pressure control arrangements might be differently located and/or that they may be automatically controlled in any suitable way, for example synchronized with the operation of the other parts of the machine.

In this way, I am enabled to obtain a predetermined back pressure within the mold by supplying pressure through the pipe 333 to the interior of the mold through the passages described, the pressure being, of course, less than that used in the expansion of a plastic article therein. Alternatively by maintaining the valves 336 and 338 closed and cracking the valve 337 a slight predetermined amount, pressure may be permitted to build up within the mold during the expansion of a plastic article therein and be gradually vented to the atmosphere at a selected and predetermined rate. Alternatively I may employ a desired degree of vacuum within the mold to assist in the expansion of an article therein, either in place of or in addition to such pressure as may be established within the expanding article.

In practice this means may be used to prevent the rupturing or undesired thinning of certain portions of the expanding plastic article during its development within the mold. It will be understood that while only the mold 5 is shown provided with a means for controlling the back pressure therein, the mold 4 will normally be provided with a similar or duplicate means and that similar means will be provided for adjusting the pressures therein.

*Neck finishing*

In forming certain types of bottles, it may be desired to form a reenforced lip thereon. One arrangement for effecting such an operation in forming bottles of this type is illustrated herein, see Figs. 9, 14, 20 and 30 to 32. As shown, the upper end of the mold is formed with a diverging cavity portion 339 which cooperates with a converging portion 340 formed in the neck ring 241. When an article is formed in the mold, as shown in Fig. 9, and sheared from the parent body of plastic material, as shown in that figure, it has a diverging neck portion 342, Fig. 30, contiguous with an annular converging portion 343 thereabove. The next operation is one in which the portion 343 is folded backwardly or inwardly onto the portion 342. This operation preferably occurs after the bottle has been at least partially rigidified, but before the complete rigidification at least of the neck portions 342 and 343, so that the portion 343 at least is somewhat moldable.

After the article has been formed to the stage shown in Fig. 30 and the mold including this article has been moved to its position out of alignment with the extrusion nozzle 22, the mold 4, Fig. 30, is in vertical alignment with a neck finishing plunger 344, there being two of these plungers, one located on each side of the central forming position and arranged to cooperate with the molds 4 and 5 respectively. These plungers are mounted for vertical movement respectively in brackets 345, Figs. 2 and 8, and are urged toward their lowermost positions in their respective brackets by compression springs 346, suitable means (not shown) being provided to prevent the movement of the plungers completely out of their associated brackets. Upon the vertical movement of the molds, as shown by a comparison of Figs. 30 and 31, to bring the mold 5 at the forming position into a desired position in respect to the extrusion nozzle 22, the mold 4 is brought upwardly to a position such that the associated plunger 344 engages the neck portion 343 of the article and folds it inwardly, as shown in Fig. 31. Inasmuch as this portion of the article is not completely rigidified, and is still somewhat moldable, it is formed in its new shape as a permanent reenforcement for the neck or lip portion of the article, as shown.

It will be understood that the plungers 344 are so located vertically in respect to the lower end of the nozzle as to exert the desired pressure on the neck portions 343 upon the upward movement of the molds and by compressing the springs 346 to a desired extent in accordance with the amount of upward movement imparted to the molds in the process of manufacture being carried on in the machine, which may be different as set forth herein, the nozzle being introduced into the mold to a desired extent or selectively maintained at the top of the mold.

When making articles with a device as shown in Fig. 20, there will be a portion of the plastic material formed beneath the horizontal surface 347 at the lower end of the nozzle intermediate the orifice 290 therein and the outer periphery of the nozzle. This portion of plastic material must be trimmed out or off before the bottle is completed, which may be done in any suitable manner (not shown).

The process of the invention and the operation of the apparatus disclosed

The first operation required is to bring the plastic material to a desired plastic and moldable condition, which is usually done by the application of a certain amount of heat, generally accompanied by a desired amount of pressure to the material. It is recognized that some materials do not require this treatment, but are initially in a condition suitable for forming without such treatment, but the treatment is usually necessary, particularly in the case of thermoplastic material, such as cellulose acetate. Some thermo-setting materials are also rendered fluent and moldable by subjecting them to a certain amount of heat, sometimes accompanied by some pressure, and are further set to their final rigid form by the application of further heat.

There is shown in Fig. 1 a means 20 for effecting this operation on thermoplastic material, such as cellulose acetate. The material is then supplied, as illustrated in Fig. 14, to the nozzle 22 either directly while holding the plunger 158 stationary and keeping open both valves 161 and 163, the pressure for extrusion being supplied by the plasticating means, or indirectly by measuring charges by the joint use of the valves 161 and 163 and the plunger 158, as above set forth. In this latter mode of operation, the plunger 158 supplies the pressure for extruding the material through the nozzle, which pressure is independent of pressures exerted on the material in converting it to a plastic and moldable condition.

The temperature and hence the viscosity of the material is controlled throughout its conversion to a plastic and moldable condition and its passage to and through the extrusion nozzle, by the temperature controlling means heretofore described. There is thus formed a hollow tubular body of plastic material in the nozzle which may be referred to as the parent body of this plastic material, and which may be extruded from the nozzle without substantial change in shape.

The next operation which must occur in the forming of hollow blown articles is the closing of the leading end of the tubular body of plastic material within the nozzle, which is usually effected at the discharge end of the nozzle and may be accomplished in any of the several ways above set forth. In this connection, it may be pointed out that one advantageous manner of doing this is by the cooperation between the discharge end of the nozzle and a shearing means, which in the present instance is the shear blade 251. Another desirable way of effecting this operation is by means, such as those shown particularly in Fig. 20. This end closing is often assisted by the establishment of a vacuum within the nozzle under control of the valve shown in Fig. 23, which has a vacuum passage for this purpose and/or vacuum may be employed subsequent to the closing of the end of the body of plastic material for assisting in the lifting of the closed end off the shear blade to permit the retraction of the latter, as shown in Fig. 26.

At the time the plastic material is to be extruded into the mold, irrespective of whether the nozzle is to be introduced into the mold or not, one or the other of the molds is brought to the central forming position in vertical alignment with the nozzle by the means hereinbefore discussed for moving the mold both vertically and laterally. The molds are then raised to a desired position in respect to the nozzle which may be a position as shown in Fig. 20, and also for the mold 5 in Figs. 30 to 32, or may be a position in which the nozzle is introduced a substantial distance into the mold, as shown for example in Figs. 14 and 27. The plastic material as a closed-ended hollow body is then extruded from the nozzle and may be either extruded against the bottom of the mold and gradually developed by blowing combined with extrusion during the withdrawal of the nozzle from the mold by downward movement of the mold with respect to the nozzle, or may be extruded to substantially the full length of the mold, as shown in Fig. 31 at the right, and thereafter developed into the shape of a hollow article.

Subsequent to this, the article formed within the mold is severed from the parent body of plastic material within the nozzle by suitable means which may comprise a single shear, as shown for example in Fig. 9, it being necessary when operating with a structure of this kind first to move the mold downwardly a sufficient distance to permit the movement of the shear blade between the flanges 244 and 245. Also, during the expansion of the glass article within the mold, the back pressure in such mold is maintained at a desired point or suitably varied by controlling the venting thereof to the atmosphere, as above set forth.

The article formed in the mold as aforesaid is rigidified in situ in the mold by suitably controlling the temperature of the walls of the mold cavity, by cooling in the case of thermoplastic material or by supplying heat thereto in the case of thermosetting material.

The next operation is the shifting of the molds as shown in Fig. 29, which is effected by first moving the molds to their lowermost position to free them from the engagement with the neck ring and the shear housing and then by laterally moving the molds to bring one mold to a laterally offset position and the other mold to a position in alignment with the nozzle for the making of the next succeeding article.

The next operation is that of neck finishing for the article, which has just been made and in the mold at the laterally offset position, which may be effected as previously described.

While I have shown and described certain apparatus and certain processes for the forming of articles, particularly hollow blown articles, such as bottles, from organic plastic material, I do not wish to be limited to the processes or apparatus herein specifically disclosed except as required by the scope of the appended claims, which are to be construed as broadly as the state of the prior art permits.

I claim as my invention:

1. In the manufacture of blown hollow articles from organic plastic materials which are expansible by blowing and thereafter capable of being rigidified, the process which comprises confining a body of plastic material in a hollow tubular chamber as a tubular body, aligning the tubular body of plastic material in said chamber and the chamber with a mold, inserting said chamber into the cavity of said mold, extruding a portion of said plastic material from said chamber in a direction substantially longitudinal thereof, withdrawing said chamber from the mold, blowing the extruded portion of plastic material into conformity with the confines of the cavity of said mold, thereby producing a blown hollow article of plastic material in said mold, separating the blown hollow article from said body of plastic material in said chamber, aligning said body of plastic material in said chamber with a second mold, rigidifying said blown hollow article in the first named mold while blowing another hollow article in said second mold, removing the rigidified article from said first mold, aligning the emptied mold with said body of plastic material in said chamber, and repeating the process.

2. In the manufacture of blown hollow articles from organic plastic materials which are expansible by blowing and thereafter capable of being rigidified, the process which comprises confining such a plastic material in an elongate hollow tubular chamber as a tubular body, heating the body of plastic material in said chamber externally, closing one end of the tubular body of plastic material in said chamber, aligning said tubular body with the mouth of a mold, introducing the closed end of said body while it is still confined in said chamber and said chamber into the cavity of said mold, gradually withdrawing said chamber from the mold cavity while extruding plastic material therefrom, applying pressure to the interior of the closed-ended hollow body of plastic material being extruded, thereby expanding the body of extruding plastic material and blowing it into conformity with the confines of said mold cavity, separating the blown plastic material in said mold from said tubular body in said chamber, again closing one end of said tubular body of plastic material in said chamber, aligning said chamber and the mouth of another mold, and repeating the process, all the steps of said process being performed automatically.

3. Apparatus for forming blown hollow articles from organic plastic materials which are expansible by blowing and thereafter capable of being rigidified, which comprises means for holding a plurality of molds, means forming an elongate annular chamber for confining a parent body of such an organic plastic material in a workable condition of plasticity, means for applying heat to the plastic material while it is in said chamber by conduction through some portions at least of the walls thereof, means for aligning the molds successively with said chamber for predetermined periods of time, means operative during each said period of alignment for extruding a predetermined quantity of plastic material from the parent body thereof in said chamber, means for blowing the extruded plastic material into contact with the walls of said molds, and means for separating the resulting blown hollow articles from the parent body of plastic material in said chamber.

4. Apparatus for forming blown hollow articles from organic plastic materials which are expansible by blowing and thereafter capable of being rigidified, which comprises means for holding a plurality of molds, means forming an elongate annular chamber for confining a parent body of such an organic plastic material in a workable condition of plasticity, means for maintaining said parent body of plastic material at an elevated temperature and under pressure, means for aligning the molds successively with said body of plastic material in said chamber for predetermined periods of time, means for relatively axially moving said chamber with the body of plastic material therein and one of said molds toward each other during each of said periods of alignment and for thereafter moving said mold and said chamber axially apart, means for extruding predetermined quantities of plastic material in tubular form from said chamber, means for blowing the extruded plastic material into contact with the walls of said molds to form blown hollow articles, means for separating the resulting blown hollow articles from the parent body of plastic material in said chamber, means for rigidifying the blown hollow articles in said molds, and means for opening said molds for the removal of the rigidified articles therefrom.

5. Apparatus for forming blown hollow articles from organic plastic materials which are expansible by blowing and thereafter capable of being rigidified, which comprises means for holding a plurality of molds, a jacketed nozzle for extruding plastic material in the form of a tube, means for maintaining the plastic material within said nozzle at an elevated temperature and under pressure, means for aligning said molds successively with said nozzle, means for relatively moving said molds and said nozzle to bring said nozzle axially within said molds while the nozzle is respectively aligned therewith and thereafter for moving said molds and said nozzle axially apart, means for extruding plastic material from said nozzle in the form of a tube, and means for blowing the extruded tubular plastic material into contact with the walls of said molds, thereby forming blown hollow articles within said molds.

6. Apparatus for automatically forming blown hollow articles from organic plastic materials which are expansible by blowing and thereafter capable of being rigidified, which comprises means for holding a plurality of molds, a nozzle for extruding plastic material from a parent body thereof in the form of a tube, means for heating the parent body of plastic material in said nozzle, means for automatically aligning said molds successively with said nozzle, means for extruding plastic material from the parent body thereof in said nozzle in the form of a tube, means for relatively moving said molds and said nozzle to bring said nozzle axially within said molds while the nozzle is respectively aligned therewith and thereafter for moving said molds and said nozzle axially apart, means for blowing the extruded plastic material into conformity with the confines of said molds to form blown hollow articles therein, means for separating the blown hollow articles from the parent body of plastic material in said nozzle, and means for opening said molds for the removal of the blown articles therefrom.

7. The apparatus of claim 3 combined with means for withdrawing air from said molds while extrusion and blowing of the plastic material are taking place.

8. The apparatus of claim 3 combined with means for producing a predetermined superatmospheric pressure within said mold outside the plastic material being extruded and blown and during the formation of a hollow article in said mold.

9. The apparatus of claim 3 combined with means for folding inwardly the severed end portions of said blown hollow articles and for uniting said portions with adjacent lower portions of the walls of said articles to form finished lip walls thereon.

10. Apparatus for forming blown hollow articles from organic plastic materials which are expansible by blowing and thereafter capable of being rigidified, which comprises means for holding a pair of molds, a nozzle for extruding plastic material from a parent body thereof in the form of a tube, means for bringing said nozzle and said molds alternately into alignment by a reciprocating motion, means for relatively moving said molds and said nozzle to bring said nozzle axially within the mold with which it is in alignment and for thereafter moving said molds and said nozzle axially apart, means for extruding plastic material from the parent body thereof in said nozzle, means for successively blowing the extruded plastic material into conformity with the confines of the aligned mold to form a succession of blown hollow articles in said molds, means for separating said blown hollow articles from the parent body of plastic material in said nozzle, means for rigidifying the blown articles in said molds, and means for opening said molds for the removal of the rigidified articles therefrom during the periods when said molds are respectively out of alignment with said nozzle.

11. The process of forming a blown hollow article from organic thermoplastic material which is expansible by blowing and thereafter capable of being rigidified, which comprises forming such a plastic material into the shape of a parent hollow body within a confined space, said hollow body having an open end, applying controlled heat and pressure to said hollow body of plastic material while in said confined space, thereby regulating the plasticity of said material, extruding the end portion of said body of plastic material from said confined space, closing the open end of the extruded end portion of the body of plastic material, introducing the end thus closed into a mold, continuing the extrusion, applying gaseous pressure within the extruded and closed end of the body of plastic material while it is still in a moldable state, thereby blowing the plastic material into conformity with the confines of the cavity of said mold to form a blown hollow article, and separating the resulting blown hollow article from the parent body of plastic material remaining in the said confined space.

12. The process of claim 11, wherein the blown hollow article of plastic material is severed from said body of said plastic material in said confined space by piercing the annular connecting wall at one point and then cutting around the circumference thereof in both directions from this point.

13. The process of claim 11, wherein the upper portion of the wall of the blown hollow article is folded backwardly and united with a contiguous lower portion of said wall, thereby forming a reinforced lip.

14. The process of claim 11, wherein air is withdrawn from the cavity of said mold during the extrusion and blowing of said plastic material therein.

15. The process of claim 11, wherein said plastic material is blown into conformity with the cavity of said mold while a superatmospheric pressure is maintained within said mold cavity outside the expanding body of plastic material.

16. The process of forming a blown hollow article from organic thermoplastic material which is expansible by blowing and thereafter capable of being rigidified, which comprises heating such an organic thermoplastic material to bring it to a moldable state of plasticity, passing said plastic material into an elongate annular chamber under superatmospheric pressure, extruding a predetermined quantity of the plastic material in hollow form from said annular chamber, applying gaseous pressure within said extruded plastic material while it is still in a moldable state of plasticity and thereby expanding said plastic material into conformity with the confines of the cavity of a mold, thereby forming a blown hollow article, and introducing additional heated plastic material into said chamber for subsequent extrusion.

17. The process of forming hollow articles from organic plastic materials which are expansible by blowing in a mold and thereafter capable of being rigidified, which comprises the steps of introducing into a mold a body of such an organic plastic material in a moldable and expansible condition and with an interior cavity therein, expanding the body of plastic material in the mold by supplying a fluid to the interior cavity thereof, and controlling the escape to the atmosphere of the air within the mold displaced by the expanding of the plastic article therein, so as to establish and maintain in the mold outside the body of plastic material being expanded therein a condition of superatmospheric pressure.

18. Apparatus for forming blown hollow articles from organic plastic materials which are expansible by blowing and thereafter capable of being rigidified, which comprises an elongate tubular nozzle, means for passing such a plastic material into said tubular nozzle under superatmospheric pressure, an annular extrusion orifice at one end of said tubular nozzle so constructed and arranged that the plastic material may be extruded therethrough without substantial change in shape, means for positively applying superatmospheric pressure to the plastic material to extrude it from the nozzle, means for applying gaseous pressure within the extruded plastic material to expand it by blowing, and a mold cooperating with said nozzle to receive and form the extruded blown plastic material.

19. The process of making hollow blown articles from thermoplastic cellulose derivatives which are expansible by blowing and thereafter capable of being rigidified, which comprises heating such a cellulose derivative to the point of fluid mobility, applying pressure thereto, advancing said cellulose derivative under heat and pressure through an annular extrusion member and into a mold cavity while the extrusion member is extended at least partly into said cavity and while applying sufficient fluid pressure to the interior of the plastic material through said extrusion member to blow the resulting extruded tubular body of plastic material into conformity with the confines of said mold cavity, and gradually withdrawing said tubular extrusion member from said mold cavity while forming a hollow blown article in said mold cavity.

20. The process of working an organic material which is hard and strong at normal temperatures and pressure and is plastic at elevated temperatures and pressures and forming therefrom a container having a reinforced, outwardly-flaring opening, comprising the steps of shaping said material under heat and pressure into a container having an opening with an outwardly-flaring inner surface and a continuation thereof in the form of an inward extension integral with said container, at least partially rigidifying said container, and folding said extension inwardly against said outwardly-flaring inner surface while said extension is still somewhat moldable.

21. The process of forming hollow articles from thermoplastic organic material, which comprises the steps of bringing the material to a moldable state by the application thereto of heat and pressure, extruding the material in a plastic and moldable state into a heated molding space to form a preliminary hollow, closed-ended shape, extruding said preliminary shape from said heated molding space, and expanding the extruded shape by internally applied pneumatic pressure against the walls of a relatively cold mold.

22. The process of forming hollow articles from temperature-sensitive organic material which at normal temperatures is hard and which becomes plastic and moldable at higher temperatures and pressures, comprising the steps of extruding such a material in a plastic and a moldable state into a heated molding space to form a preliminary hollow shape having a closed end, extruding said preliminary shape from said heated molding space, and expanding said shape by internally applied pneumatic pressure to conformity with the walls of a relatively cold mold against air trapped between the mold walls and the expanding shape while controllably venting such trapped air.

23. The process of forming hollow articles from organic plastic material which at normal temperatures is hard and which is rendered fluent and moldable under elevated temperatures and pressure, comprising the steps of forming a tubular extrusion body having an open end from the fluent and moldable material, heating said extrusion body both internally and externally, closing the open end thereof, extending said extrusion body by further extrusion while supporting the walls of the extended extrusion against collapse by the internal application of pneumatic pressure, and expanding the extended extrusion by the application of pneumatic pressure applied within said extended extrusion to bring the distended extrusion into contact with a confining mold cavity whereupon it hardens in situ.

24. The process according to claim 23, wherein said open end of the tubular extrusion body is closed by extruding the plastic material against a molding surface to bring the annular edges of the extrusion body together and to unite the material.

25. Apparatus for forming hollow articles from organic plastic material which at normal temperatures is hard and which becomes plastic and moldable at elevated temperatures and under pressure, comprising means for rendering such material plastic and moldable by the application of heat and pressure thereto, means defining an annular extrusion passageway for the moldable material, a closure for such passageway movable into an open position, and mold parts so constructed and arranged to be assembled into operative relation to receive the moldable material from said annular passageway and when so assembled, to form a closed mold having an entrance which is in sealed relation with the means defining said annular passageway.

26. Apparatus in accordance with claim 25, including in combination means for internally applying pneumatic pressure for expanding a closed-ended extrusion body of plastic material extending from the means defining said annular passageway, and means for controllably venting air trapped between the walls of said mold and the expanding extrusion body.

27. In the manufacture of hollow articles, the process which comprises forming an organic material capable of becoming plastic and moldable under conditions of heat and pressure into the shape of a closed-ended hollow body within a confined space, applying heat and pressure to said hollow body while in said confined space, extruding the closed end of said body from said confined space and into a mold, and applying gaseous pressure within the closed extruded end to blow the plastic material against the confines of said mold.

28. The process of claim 27 wherein said hollow body of plastic material is heated internally while within said confined space.

29. The process of claim 27 wherein said hollow body of plastic material is heated externally while within said confined space.

30. The process of claim 27 wherein said hollow body of plastic material is heated both internally and externally while within said confined space.

31. In the manufacture of blown hollow articles, the process which comprises forming an organic plastic material which is capable of becoming fluent and moldable under conditions of heat and pressure into the shape of an elongated closed-ended body confined internally and externally, applying heat and pressure to said confined body of plastic material and by said pressure extruding a closed-ended body of plastic material from confinement and into a mold, applying gaseous pressure within said extruded closed-ended body of plastic material, and thereby blowing it to conformity with the confines of said mold, and separating the resulting blown article from the plastic material remaining in confinement as aforesaid.

32. The process of forming blown hollow articles from organic plastic material which is expansible by blowing and thereafter capable of being rigidified, which comprises distending a hollow body of such a plastic material by interiorly applied pneumatic pressure, and suppressing rupturing and unequal thinning of the distending body by exteriorly applied superatmospheric pressure which is gradually released to allow uniform and equal distension of the hollow body of plastic material into contact with the confining walls of a mold cavity.

33. Apparatus for forming articles from organic plastic material, comprising continuously operating means for bringing said material to a plastic and moldable condition, and intermittently operating extrusion and distending means for receiving plastic and moldable material from the first-named means and for forming it into the desired articles.

34. Apparatus according to claim 33 wherein a variable capacity receiving means is provided intermediate the named means for bringing the material to a plastic and moldable condition and the named means for forming plastic material by extrusion and distension, to receive excess material from the first-named means when the second-named means is not receiving material therefrom and for later delivery to the second-named means when it is receiving such material.

35. Apparatus for forming articles from organic plastic material, comprising means for bringing the material to a plastic and moldable condition, an extrusion nozzle having a tubular passage therein arranged to receive plastic material in a moldable condition from the first-named means, a mold adapted to be brought into cooperative relation with said nozzle and to form articles of the desired shape, and cam operated means for mechanically extruding plastic material from said nozzle at a rate predetermined in accordance with the different diameters of the cavity of said mold at different levels thereof and the desired wall thicknesses for the article to be formed in said mold at such levels.

36. Apparatus for forming articles from organic plastic material, comprising means for bringing the material to a plastic and moldable condition, an extrusion nozzle having a tubular passage therein arranged to receive plastic material in a moldable condition from the first-named means, a mold adapted to be brought into cooperative relation with said nozzle and to form articles of the desired shape, a continuously rotating shaft, a reciprocable plunger for forcing plastic material through said tubular passage, cam means including a resilient connection for reciprocating said plunger in response to rotation of said shaft, and means for supplying pneumatic pressure through said nozzle to expand the plastic material extruded therefrom into conformity with the cavity of said mold.

37. Apparatus for forming articles from organic plastic material, comprising an extrusion nozzle including inner and outer nozzle members spaced to provide a tubular passage therebetween and arranged to receive plastic material in a moldable condition, said inner nozzle member terminating short of the end of the said outer member at the discharge end of said nozzle, and means cooperating with the discharge end of said nozzle for severing plastic material extruded therefrom and for assisting in the forming of a closed end for the plastic material in the tubular passage of said nozzle.

38. Apparatus for forming articles from organic plastic material, comprising an extrusion nozzle including inner and outer nozzle members spaced to provide a tubular passage therebetween and arranged to receive plastic material in a moldable condition, a mold cooperable with said nozzle in the forming of articles, means for forming plastic material extruded from said nozzle into hollow articles in said mold, and a shear for severing a completed article formed in said mold from the plastic material remaining in the tubular passage of said nozzle and cooperating thereafter with said nozzle in forming a closed end for the body of plastic material in the tubular passage in the nozzle.

39. Apparatus for forming articles from organic plastic material, comprising an extrusion nozzle including inner and outer nozzle members spaced to provide a tubular passage therebetween and arranged to receive plastic material in a moldable condition, said inner nozzle member terminating short of the outer end of said outer nozzle member, and said outer nozzle member having an extrusion orifice in its end of less diameter than the outside diameter of said inner nozzle member to assist in the forming of a closed end for a body of plastic material within said nozzle at the discharge end thereof.

40. Apparatus for forming articles from organic plastic material, comprising an extrusion nozzle arranged to receive the plastic material in a moldable condition and including inner and outer nozzle members spaced to provide a tubular passage therebetween, said inner nozzle member terminating short of the outer end of said outer nozzle member, and said outer nozzle member having an extrusion orifice in its end of less diameter than the inside diameter of the outer nozzle member at points spaced from said orifice to assist in the forming of a closed end for a body of plastic material within said nozzle at the discharge end thereof, and means for adjusting said inner nozzle member longitudinally of said outer nozzle member so as adjustably to predetermine the distance between the ends of said inner and outer nozzle members at the discharge end of the nozzle.

41. Apparatus for forming articles from organic plastic material, comprising an extrusion nozzle including inner and outer nozzle members spaced to provide a tubular passage therebetween and arranged to receive plastic material in a moldable condition, said inner nozzle member terminating short of the end of said outer nozzle member at the discharge end of said nozzle and having a portion at its discharge end cooperating with the discharge end of said outer nozzle member to effect an annular shearing of the plastic material upon the relative movement of said nozzle members in a direction such that their ends at the discharge end of the nozzle approach each other, and means for effecting such relative movement of said nozzle members for shearing the plastic material therebetween.

42. Apparatus for forming articles from thermo-sensitive organic plastic material which at normal temperatures is hard and which may be rendered plastic and moldable at elevated temperatures and under pressure, comprising means for bringing the material to a plastic and moldable condition by the application of heat and pressure thereto, an extrusion nozzle arranged to receive plastic material in a moldable condition from the first-named means including inner and outer nozzle members spaced to provide a tubular passage therebetween, said inner nozzle member terminating short of the end of said outer nozzle member at the discharge end of said nozzle, means in each of said nozzle members for controlling the temperature of the plastic material passing through said nozzle, said inner nozzle member having a part at its end formed to cooperate with the end of said outer nozzle member for shearing plastic material therebetween at a susbtantially circular shearing line upon the movement of said inner nozzle member longitudinally of said outer nozzle member and toward the discharge end of the latter, and cam-operated means for moving said inner nozzle member to shear plastic material as aforesaid.

43. Apparatus for forming articles from organic plastic material by a process including the extrusion of the material in a plastic condition, comprising extrusion means arranged to receive plastic material in a plastic and moldable condition, a reciprocable plunger for forcing the plastic material from the orifice of said extrusion means, means to reciprocate said plunger, valve means so constructed and arranged as to permit flow of plastic material to the space being vacated by the said plunger on the retraction thereof while closing this space to the extrusion orifice and to close the inlet opening to said space and open a passage to said orifice on the forward stroke of said plunger, and means to operate said valve means as aforesaid in synchronism with the plunger reciprocating means.

44. Apparatus for forming articles from organic plastic material by a process including the extrusion of the material, comprising extrusion means arranged to receive plastic material in a moldable condition and having an extrusion orifice at its discharge end, a reciprocable plunger for forcing the plastic material outwardly through said orifice, valve means constructed and arranged to permit flow of said material to the space being vacated by said plunger on the retraction thereof while closing this space to the extrusion orifice and to close the inlet opening to said space and to open a passage to said orifice on the forward stroke of said plunger, interchangeable cam means for operating and predetermining the stroke of said plunger to predetermine the amount of material to be delivered from said extrusion orifice in the making of each article, and means to operate said valve means as aforesaid in synchronism with the plunger operating means.

45. Apparatus for forming articles from organic plastic material by a process including the extrusion of the material, comprising means to bring the plastic material to a plastic and moldable condition, extrusion means arranged to receive the material in a plastic and moldable condition from the first named means and having an extrusion orifice at its discharge end, a reciprocable plunger for forcing plastic material outwardly through said orifice, a continuously rotating shaft, cam means associated with said shaft for actuating said plunger through a complete reciprocatory movement on each revolution of said shaft, rotatable valve means constructed and arranged to permit the flow of plastic material from the first named means into the space vacated by said plunger on the retraction thereof while closing this space to the extrusion orifice and on the forward movement of said plunger to close the connection to the first named means and open a passage to said orifice for the extrusion of material therethrough, and means for rotating said valve means in synchronized timed relation to the rotation of said shaft.

46. Apparatus for forming articles from plastic material, comprising a mold, means providing an extrusion orifice from which the plastic material may be extruded into said mold, means for relatively moving said mold and the orifice toward and away from each other during the forming of each article, means for extruding plastic material through said orifice into said mold for forming articles therein while the articles remain integral with the plastic material within the orifice-providing means during their formation, shearing means movable in respect to the orifice in a direction parallel to the direction of relative movement of the orifice and said mold, and means not partaking of the movement of said shearing means for actuating such means to sever an article formed in said mold from the material within said orifice-providing means.

47. Apparatus according to claim 46, wherein said shearing means comprises a single shear blade mounted for movement in a housing which is in turn mounted for movement with said mold throughout a selected part at least of the cycle of the entire apparatus, and means in said housing for resiliently urging said shear blade toward its inoperative position.

48. Apparatus in accordance with claim 46, wherein said shearing means comprises a single blade movably mounted in a housing which in turn is mounted for movement with said mold throughout a selected part at least of the cycle of the entire apparatus, means in said housing for resiliently urging said shear blade towards its inoperative position, and wherein the means recited for actuating said shearing means comprises a means engageable with said shear blade at one position of said housing for quickly moving said blade across said orifice against the force of the resilient means which tend to move said blade toward its inoperative position.

49. Apparatus for forming hollow blown articles from organic plastic material, comprising a mold, an extrusion nozzle from which the plastic material in a moldable condition is adapted to be extruded into said mold, means for moving said mold in a direction longitudinal of said nozzle to an extent such that in one extreme position of the movement of the mold, the nozzle extends a predetermined distance thereinto, means for extruding plastic material from said nozzle and for expanding it by internally applied pneumatic pressure into conformity with the cavity of said mold while the plastic material being thus formed in said mold remains integral with the plastic material within said nozzle, a shear housing arranged to be seated upon the end of said mold adjacent to said nozzle, a shear blade movably mounted in said housing, resilient means for urging said shear blade away from a position across the orifice of said nozzle, shear actuating means not partaking of the movement of said mold, said housing and said shear blade toward and away from said nozzle, and means interconnecting said shear blade and said shear actuating means at a predetermined position of said mold for causing said shear blade to move across said nozzle to sever an article formed in said mold from the plastic material remaining in said nozzle.

50. Apparatus for forming articles from plastic material, comprising an extrusion nozzle including inner and outer nozzle members spaced to provide a tubular passage for plastic material, a mold arranged to receive plastic material extruded from said nozzle for the forming of a hollow article of plastic material in said mold while that article remains integral with the plastic material in said nozzle, a shear blade movable across the discharge end of said nozzle to sever an article formed in said mold from the plastic material remaining in said nozzle, said shear blade being further so constructed, arranged and operated as to remain in position subsequent to the severance effected thereby to cooperate with said nozzle in forming a closed end on the tubular body of plastic material within said nozzle in preparation for the forming of the next succeeding article, and means for raising said nozzle with the closed-ended tubular body of plastic material therein to raise the closed end thereof off said shear blade and permit retraction of the latter prior to the extrusion of the closed-ended tubular body of plastic material from said nozzle for forming the next succeeding article.

51. Apparatus for forming bottles from plastic material, comprising a plurality of molds arranged to be employed successively in the formation of bottles, means forming an orifice through which the plastic material is extruded into said molds in forming bottles, means including the orifice-forming means for forming bottles in each of said molds successively while the molds are respectively in cooperative relation with said orifice-forming means and including means for moving all said molds simultaneously in directions toward and from said orifice-forming means, and means actuated by this movement of said molds for finishing the neck portion of a bottle in one mold during the formation of a succeeding bottle in another mold.

52. Apparatus in accordance with claim 51, wherein there are two molds mounted on a common support and arranged to be oscillated laterally in respect to said orifice-forming means to cooperate alternately therewith, and wherein there are two similar neck finishing means arranged respectively on opposite sides of said orifice-forming means, so that one bottle is being formed in one of said molds during the finishing of the neck of a bottle in the other of said molds.

53. Apparatus for forming articles from organic plastic material, comprising means to bring the material to a plastic and moldable condition including means for applying pressure to the material, an extrusion nozzle arranged to receive plastic material from the first named means, a mold in which an article is to be formed from material extruded from said nozzle, and separate and distinct means associated with said extrusion nozzle for applying pressure to the material to extrude it from said nozzle incident to the forming of an article in said mold, the last named means exerting a pressure on the plastic material independent of the pressure used for bringing the material to a plastic and moldable condition as aforesaid.

54. Apparatus according to claim 52, comprising in addition, means for adjustably varying the maximum pressure effective on the material for extruding it from said nozzle.

55. Apparatus for forming articles from plastic material, comprising a plurality of molds, an extrusion nozzle for the plastic material, shearing means movable toward and away from said nozzle and arranged to be seated on said molds successively, means for laterally moving said molds to bring them successively into alignment with said nozzle and said shearing means, means to move a mold in alignment with said nozzle and said shearing means toward and away from said nozzle, and means for supporting said shearing means in a predetermined position in respect to said nozzle during the lateral movement of said molds to move one mold from a position in alignment with said nozzle to another position and to bring a second mold into alignment with said nozzle.

56. Apparatus in accordance with claim 55, wherein the articles to be formed are bottles, and wherein a single neck forming means is provided which is carried by said shearing means and constructed and arranged to cooperate with each of said molds successively during the formation of a bottle therein.

57. Apparatus for forming articles from plastic material, comprising a table, a plurality of molds thereon, means to raise and lower said table in the forming of each article in one of said molds, means to open and close said molds controlled in part at least by the table raising and lowering means, and means effective to move the table to bring a second of said molds to the position previously occupied by a first of said molds during the time the table is in its lowermost position.

58. Apparatus for forming articles from plastic material, comprising a table, a plurality of molds thereon, means to raise and lower said table in the forming of each article in one of said molds, means to open and close said molds, and means including Geneva driving and driven members for moving said table to bring said molds successively to a predetermined position during the time the table is at its lowermost position, said driven member only of said driving and driven members of the Geneva partaking of the raising and lowering movement of said table as aforesaid.

59. Apparatus for forming articles from plastic material, comprising a laterally movable table, two molds thereon arranged to be brought by a reciprocatory movement of said table alternately to a forming position, means to raise and lower said table during the forming of each article in one of said molds, means to open and close said molds, and a Geneva driving mechanism for reciprocating said table to bring said molds alternately to the forming position including a continuously rotating driving member not partaking of the vertical movement of said table and arranged to make one complete revolution for each movement of said table from one end to the other of its lateral reciprocatory movement and a driven member moving vertically with said table.

60. Apparatus for forming articles from plastic material, comprising a laterally reciprocable table, two molds mounted on said table and arranged to be brought by the reciprocatory movements thereof alternately to a central forming position, means for reciprocating said table to bring said molds alternately to the forming position, means to form articles successively in said molds when they are respectively at the forming position, means for closing said molds, and means effective to open each mold while it is away from said forming position.

61. Apparatus for forming articles from plastic material, comprising a laterally reciprocable table, two molds thereon movable alternately to a central forming position, means to reciprocate said table to bring said molds alterantely to said forming position, means to move said table vertically during the forming of each article, means to form articles in said molds when they are respectively at the forming position, and means responsive to the vertical movement of said table for opening said molds respectively when they are away from said forming position.

62. Apparatus in accordance with claim 61, wherein the means for opening the molds are so constructed and arranged as to open said molds respectively during and in response to the lowering of said table when said molds are respectively out of said forming position.

63. Apparatus for forming articles from plastic material, comprising a vertically reciprocable table, means to reciprocate said table vertically, two molds mounted on said table, means to reciprocate said table laterally to bring said molds alternately to a central forming position, a horizontal shaft at each end of said table and rotatable in respect thereto, means interconnecting each of said shafts with one of said molds and so constructed and arranged that rotation of said shafts will open and close said molds respectively, an arm on one end of each of said shafts and projecting from said table, and means not partaking of the movements of said table and cooperating with said arms for opening said molds respectively during the time that said molds are respectively laterally away from said forming position.

ENOCH T. FERNGREN.